(12) United States Patent
Ma et al.

(10) Patent No.: US 12,301,397 B2
(45) Date of Patent: May 13, 2025

(54) SYMBOL PROCESSING METHOD AND APPARATUS

(71) Applicant: Huawei Technologies Co., Ltd., Shenzhen (CN)

(72) Inventors: Qianli Ma, Chengdu (CN); Fengwei Liu, Chengdu (CN); Huang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 449 days.

(21) Appl. No.: 17/733,783

(22) Filed: Apr. 29, 2022

(65) Prior Publication Data

US 2022/0263697 A1 Aug. 18, 2022

Related U.S. Application Data

(63) Continuation of application No. PCT/CN2019/114462, filed on Oct. 30, 2019.

(51) Int. Cl.
*H04L 27/26* (2006.01)

(52) U.S. Cl.
CPC ...... *H04L 27/2613* (2013.01); *H04L 27/2607* (2013.01); *H04L 27/2636* (2013.01)

(58) Field of Classification Search
CPC ............ H04L 27/2613; H04L 27/2607; H04L 27/2636
See application file for complete search history.

(56) References Cited

U.S. PATENT DOCUMENTS

2007/0217329 A1\* 9/2007 Abedi ................. H04L 5/0044
370/480
2011/0305286 A1 12/2011 Shimezawa et al.
(Continued)

FOREIGN PATENT DOCUMENTS

CN 1478341 A 2/2004
CN 107770110 A 3/2018
(Continued)

OTHER PUBLICATIONS

"3rd Generation Partnership Project; Technical Specification Group Radio Access Network; NR; Physical channels and modulation (Release 15)," 3GPP TS 38.211 V15.7.0, total 97 pages, 3rd Generation Partnership Project, Valbonne, France (Sep. 2019).
(Continued)

*Primary Examiner* — Rasheed Gidado
(74) *Attorney, Agent, or Firm* — Leydig, Voit & Mayer, Ltd.

(57) ABSTRACT

A symbol processing method and apparatus are provided. The method includes: obtaining, based on a plurality of complex-valued symbols, a first set corresponding to a first transmit symbol and a second set corresponding to a second transmit symbol; performing a copy operation on the first set and the second set, so that both the first set and the second set have a first complex-valued symbol; performing signal processing on the first set and the second set; and performing phase adjustment on the first transmit symbol and/or the second transmit symbol after the signal processing, to ensure that a symbol component whose end position is the first reference point in the first transmit symbol is the same as a symbol component whose end position is the second reference point in the second transmit symbol. This application can ensure that an inter-symbol guard period is flexibly configured.

18 Claims, 19 Drawing Sheets

(56) References Cited

U.S. PATENT DOCUMENTS

| | | | |
|---|---|---|---|
| 2012/0166119 A1 | 6/2012 | Nentwig et al. | |
| 2015/0256378 A1* | 9/2015 | Siti et al. | |
| 2017/0085308 A1* | 3/2017 | Sun | H04B 7/0669 |
| 2017/0339697 A1 | 11/2017 | Park et al. | |
| 2018/0255542 A1 | 9/2018 | Seo et al. | |
| 2018/0262306 A1* | 9/2018 | Hadani | H04L 27/2697 |
| 2021/0288859 A1* | 9/2021 | Radosevic | H03M 13/27 |

FOREIGN PATENT DOCUMENTS

| | | | |
|---|---|---|---|
| CN | 108965187 A | 12/2018 | |
| CN | 105745889 B | 3/2019 | |
| CN | 109428846 A | 3/2019 | |
| WO | 2008056901 A1 | 5/2008 | |
| WO | 2013066692 A1 | 5/2013 | |
| WO | 2018201446 A1 | 11/2018 | |
| WO | 2019101371 A1 | 5/2019 | |

OTHER PUBLICATIONS

Samsung, "OFDM Baseband Signal Generation for Initial Access," 3GPP TSG RAN WG1 #91, Reno, USA, R1-1721497, Total 3 pages (Nov. 27-Dec. 1, 2017).

\* cited by examiner

①, ②, and ③ are three optional occasions for performing a cyclic shift $L_{CP}$ represents a length equivalent to a CP length in a time domain vector before DFT

SYMBOL PROCESSING METHOD AND APPARATUS

CROSS-REFERENCE TO RELATED APPLICATIONS

This application is a continuation of International Application No. PCT/CN2019/114462, filed on Oct. 30, 2019, which is incorporated herein by reference in its entirety.

TECHNICAL FIELD

Embodiments of this application relate to the communication field, and specifically, to a symbol processing method and apparatus.

BACKGROUND

To resist a channel multipath effect, a technology of adding a guard period between symbols is proposed. First, the guard period may cancel inter-symbol interference (ISI) between adjacent symbols. Second, after a multipath channel, the guard period converts a linear convolution of the channel and a transmit symbol into a cyclic convolution of the channel and the transmit symbol, so that a symbol receive end can eliminate the channel multipath effect by using a frequency domain equalization method.

Usually, a cyclic prefix (CP) is used as the inter-symbol guard period. The CP is a cyclic structure obtained by copying a segment of data at the back (or referred to as a tail) of a data symbol to the front (or referred to as a header) of the symbol. However, this technique for providing the inter-symbol guard period is inflexible and not configured based on a user requirement.

SUMMARY

This application provides a symbol processing method and apparatus, to ensure that an inter-symbol guard period can be flexibly configured based on a user requirement.

According to a first aspect, a symbol processing method is provided. The method includes: performing phase adjustment on a first transmit symbol and/or a second transmit symbol, so that a symbol component whose end position is a first reference point in the first transmit symbol is the same as a symbol component whose end position is a second reference point in the second transmit symbol after the adjustment, where the first reference point represents an end position of the transmit symbol, the second reference point represents a position of a truncated CP of the transmit symbol, the first transmit symbol and the second transmit symbol are continuous in time domain, and the first transmit symbol is located before the second transmit symbol.

Optionally, "a symbol component whose end position is a first reference point in the first transmit symbol is the same as a symbol component whose end position is a second reference point in the second transmit symbol after the adjustment" may also be understood as "after the phase adjustment, the symbol component of the first transmit symbol at the first reference point and the symbol component of the second transmit symbol at the second reference point are continuous."

In this application, for the first transmit symbol and the second transmit symbol that are continuous in time domain, performing the phase adjustment on the first transmit symbol and/or the second transmit symbol can ensure that the symbol component whose end position is the first reference point in the first transmit symbol is the same as the symbol component whose end position is the second reference point in the second transmit symbol. In this way, a length of a symbol component shared between the first transmit symbol and the second transmit symbol can be controlled, and an inter-symbol guard period is flexibly configured.

In addition, it should be understood that the length of the symbol component shared between the first transmit symbol and the second transmit symbol does not affect a frame structure of the transmit symbol. Therefore, for users with different channel conditions, the phase adjustment is performed to configure different lengths for the shared symbol component. First, the inter-symbol guard period can be flexibly configured. Second, (frequency division, space division, and time division) multiplexing can also be performed among users configured with different guard periods.

Therefore, in this application, when a CP length is fixed, it can be ensured that the inter-symbol guard period can be flexibly configured, and a length of the guard period can be flexibly configured based on a user requirement.

According to a second aspect, a symbol processing method is provided. The method includes: obtaining a plurality of complex-valued symbols; grouping the plurality of complex-valued symbols into a plurality of sets, where each set corresponds to one transmit symbol; performing a copy operation on the plurality of sets, so that two sets corresponding to two transmit symbols continuous in time domain have a part of same complex-valued symbols; after the copy operation, performing signal processing on the plurality of sets; and performing phase adjustment on the transmit symbols after the signal processing, so that the part of same complex-valued symbols between the two sets corresponding to the two transmit symbols continuous in time domain are continuous.

In this application, the copy operation is performed on the two sets corresponding to the two transmit symbols continuous in time domain, so that the two sets have the same complex-valued symbol, thereby helping obtain the first transmit symbol and the second transmit symbol in the method provided in the first aspect. In addition, the phase adjustment helps resolve a problem that the flexible-length guard period is invalid due to phase discontinuity when information is placed at a non-zero frequency bandwidth, that is, it can be ensured that an inter-symbol guard period is flexibly configured.

According to a third aspect, a symbol processing method is provided. The method includes: obtaining a plurality of complex-valued symbols; grouping the plurality of complex-valued symbols into a plurality of sets, where each set corresponds to one transmit symbol, the plurality of sets include a first set corresponding to a first transmit symbol and a second set corresponding to a second transmit symbol, the first transmit symbol and the second transmit symbol are continuous in time domain, and the first transmit symbol is located before the second transmit symbol; performing a copy operation on the first set and the second set, so that both the first set and the second set have a first complex-valued symbol, where a subset formed by the first complex-valued symbol in the first set is referred to as a first subset, a subset formed by the first complex-valued symbol in the second set is referred to as a second subset, and a time domain position of the first subset and a time domain position of the second subset may be the same or may be different; performing signal processing on the first set and the second set after the copy operation, to generate the first transmit symbol and the second transmit symbol, where the signal processing includes a cyclic shift or frequency domain weighting; and performing phase adjustment on the first transmit symbol and/or the second transmit symbol, so that a part of same complex-valued symbols between the two sets corresponding to the first transmit symbol and the second transmit symbol after the adjustment are continuous.

It should be understood that if the signal processing is the cyclic shift, the signal processing is performed on a time domain signal corresponding to the first set and a time domain signal corresponding to the second set; or if the signal processing is the frequency domain weighting, the frequency domain weighting is performed on a frequency domain signal corresponding to the first set and a frequency domain signal corresponding to the second set.

There are a plurality of implementations for performing the signal processing on the first set and the second set after the copy operation.

Optionally, in a first implementation, the signal processing includes first signal processing, and the first signal processing includes the cyclic shift or the frequency domain weighting.

In the first implementation, the performing signal processing on the first set and the second set after the copy operation includes: separately performing the first signal processing on the first set and the second set after the copy operation, where the first signal processing causes an end position of the first subset to correspond to a first reference point of the first transmit symbol and causes an end position of the second subset to correspond to a second reference point of the second transmit symbol. The first reference point represents an end position of the transmit symbol, and the second reference point represents a position of a truncated CP of the transmit symbol.

It should be understood that, because the copy operation is performed on the first set and the second set corresponding to the first transmit symbol and the second transmit symbol continuous in time domain, both the first set and the second set have the first complex-valued symbol; because the first signal processing is performed on the first set and the second set, the end position of the first subset formed by the first complex-valued symbol in the first set corresponds to the first reference point of the first transmit symbol, and the end position of the second subset in the second set corresponds to the second reference point of the second transmit symbol; and because the phase adjustment is performed on the transmit symbols generated by the first signal processing, the first transmit symbol and the second transmit symbol in the method provided in the first aspect can be obtained. Therefore, in this application, performing the phase adjustment on the transmit symbols can ensure that an inter-symbol guard period is flexibly configured, that is, given a fixed CP length, the inter-symbol guard period can be flexibly configured.

Optionally, in a second implementation, the signal processing includes first signal processing and second signal processing, the first signal processing includes the cyclic shift or the frequency domain weighting, and the second signal processing includes the cyclic shift or the frequency domain weighting. If the first signal processing is the cyclic shift, the second signal processing is the cyclic shift. If the first signal processing is the frequency domain weighting, the second signal processing may be the frequency domain weighting or the cyclic shift.

In the second implementation, the performing signal processing on the first set and the second set after the copy operation includes: separately performing the first signal processing on the first set and the second set after the copy operation, where the first signal processing causes an end position of the first subset to correspond to a first reference point of the first transmit symbol and causes an end position of the second subset to correspond to a second reference point of the second transmit symbol; and simultaneously performing the second signal processing on a signal of the first set after the first signal processing and a signal of the second set after the first signal processing, where the second signal processing causes a start position of the first subset to correspond to a position before the first reference point of the first transmit symbol and the end position of the first subset to correspond to a position after the first reference point of the first transmit symbol, and causes a start position of the second subset to correspond to a position before the second reference point of the second transmit symbol and the end position of the second subset to correspond to a position after the second reference point of the second transmit symbol, where the first reference point represents an end position of the transmit symbol, and the second reference point represents a position of a truncated CP of the transmit symbol.

In the second implementation, the second signal processing may be understood as a common shift operation on the first set and the second set.

It should be understood that, because the copy operation is performed on the first set and the second set corresponding to the first transmit symbol and the second transmit symbol continuous in time domain, both the first set and the second set have the first complex-valued symbol; because the first signal processing and the second signal processing are performed on the first set and the second set, the start position and the end position of the first subset respectively correspond to the positions before and after the first reference point of the first transmit symbol, and the start position and the end position of the second subset respectively correspond to the positions before and after the second reference point of the second transmit symbol; and because the phase adjustment is performed on the transmit symbols generated by the first signal processing and the second signal processing, the first transmit symbol and the second transmit symbol in the method provided in the first aspect can be obtained. Therefore, in this application, performing the phase adjustment on the transmit symbols can ensure that an inter-symbol guard period is flexibly configured, that is, given a fixed CP length, the inter-symbol guard period can be flexibly configured.

In addition, it should be understood that, because the first signal processing and the second signal processing are performed on the first set and the second set, the start position and the end position of the first subset respectively correspond to the positions before and after the first reference point of the first transmit symbol, and the start position and the end position of the second subset respectively correspond to the positions before and after the second reference point of the second transmit symbol, and this can reduce adverse impact of a filter smearing effect on extension of the inter-symbol guard period to some extent.

Optionally, in a third implementation, the signal processing includes third signal processing, and the third signal processing includes the cyclic shift or the frequency domain weighting.

In the third implementation, the performing signal processing on the first set and the second set after the copy operation includes: separately performing the third signal processing on the first set and the second set after the copy operation, where the third signal processing causes a start position of the first subset to correspond to a position before the first reference point of the first transmit symbol and an end position of the first subset to correspond to a position after the first reference point of the first transmit symbol, and causes a start position of the second subset to correspond to a position before the second reference point of the second transmit symbol and an end position of the second subset to correspond to a position after the second reference point of the second transmit symbol, where the first reference point represents an end position of the transmit symbol, and the second reference point represents a position of a truncated CP of the transmit symbol.

It should be understood that the third implementation may be considered as a result of combining the first signal processing and the second signal processing in the second implementation into one-time signal processing, where both the first signal processing and the second signal processing are the cyclic shift, or both the first signal processing and the second signal processing are the frequency domain weighting.

It should be further understood that, because the copy operation is performed on the first set and the second set corresponding to the first transmit symbol and the second transmit symbol continuous in time domain, both the first set and the second set have the first complex-valued symbol; because the third signal processing is performed on the first set and the second set, the start position and the end position of the first subset respectively correspond to the positions before and after the first reference point of the first transmit symbol, and the start position and the end position of the second subset respectively correspond to the positions before and after the second reference point of the second transmit symbol; and because the phase adjustment is performed on the transmit symbols generated by the third signal processing, the first transmit symbol and the second transmit symbol in the method provided in the first aspect can be obtained. Therefore, in this application, performing the phase adjustment on the transmit symbols can ensure that an inter-symbol guard period is flexibly configured, that is, given a fixed CP length, the inter-symbol guard period can be flexibly configured.

In addition, it should be understood that, because the third signal processing is performed on the first set and the second set, the start position and the end position of the first subset respectively correspond to the positions before and after the first reference point of the first transmit symbol, and the start position and the end position of the second subset respectively correspond to the positions before and after the second reference point of the second transmit symbol, and this can reduce adverse impact of a filter smearing effect on extension of the inter-symbol guard period to some extent.

It should be noted that "the start position of the first subset corresponds to the position before the first reference point of the first transmit symbol, and the end position of the first subset corresponds to the position after the first reference point of the first transmit symbol" mentioned in this specification means that the start position of the first subset in the first set corresponds to a tail position of the first transmit symbol, and that the end position of the first subset corresponds to a header position of the first transmit symbol.

A prerequisite for "the start position of the first subset corresponds to the position before the first reference point of the first transmit symbol, and the end position of the first subset corresponds to the position after the first reference point of the first transmit symbol" mentioned in this specification is that the signal processing is performed on the first set, that is, the cyclic shift or the frequency domain weighting is performed on the first set. It should be understood that, under the prerequisite of the cyclic shift (or the frequency domain weighting), "the end position of the first subset corresponds to the position after the first reference point of the first transmit symbol" may be understood as "the end position of the first subset corresponds to the header position of the first transmit symbol" or "the end position of the first subset corresponds to a position after a third reference point of the first transmit symbol, where the third reference point represents the start position of the transmit symbol". Alternatively, from a time domain structure of the first transmit symbol, "the end position of the first subset corresponds to the position after the first reference point of the first transmit symbol" may be expressed as "the end position of the first subset corresponds to the position before the first reference point of the first transmit symbol".

It should be further noted that the first reference point of the first transmit symbol (that is, the end position of the first transmit symbol) is covered in this specification to describe a case in which a time domain position of the first subset corresponds to a time domain position of the first transmit symbol. Therefore, the following description manner is used: "The start position of the first subset corresponds to the position before the first reference point of the first transmit symbol, and the end position of the first subset corresponds to the position after the first reference point of the first transmit symbol."

With reference to the third aspect, in a possible implementation of the third aspect, the performing phase adjustment on the first transmit symbol and/or the second transmit symbol includes: performing the phase adjustment on the first transmit symbol and/or the second transmit symbol based on one or more of the following information: an inverse fast Fourier transform (IFFT) size, a CP length, a frequency resource position, a subcarrier center position, a subcarrier spacing, a sampling interval, a transmit symbol period, and a transmit symbol index.

It may be understood that a phase compensation factor used to adjust a phase of the transmit symbol may be determined based on one or more of the foregoing information.

With reference to the third aspect, in a possible implementation of the third aspect, the performing phase adjustment on the first transmit symbol and/or the second transmit symbol includes: performing the phase adjustment on the first transmit symbol and/or the second transmit symbol based on a phase difference between the first transmit symbol and the second transmit symbol.

In this application, based on a phase difference between two adjacent transmit symbols, phase adjustment may be performed on the two transmit symbols or either of the two transmit symbols, so that symbol components shared by the two transmit symbols have a same phase.

With reference to the third aspect, in a possible implementation of the third aspect, the phase difference between the first transmit symbol and the second transmit symbol satisfies either of the following formulas:

$$e^{\left(j\frac{2\pi f_0 \Delta f T_{CP,l}}{N}\right)} \text{ or } e^{\left(j\frac{2\pi f_0 \Delta f N_{CP,l}}{N}\right)},$$

where $f_0$ represents the subcarrier center position, $\Delta f$ represents the subcarrier spacing, $T_{CP,l}$ represents duration of a CP of an $l^{th}$ transmit symbol, $N_{cp,l}$ represents a quantity of sampling points of the CP of the $l^{th}$ transmit symbol, l represents the transmit symbol index, j represents a complex-valued symbol, and N represents the IFFT size.

It should be understood that round-up is merely an example for description. For example, rounding may alternatively be round-down or round-off.

It should be further understood that the phase difference between the two transmit symbols represents a phase difference before the phase adjustment.

With reference to the third aspect, in a possible implementation of the third aspect, the performing a phase adjustment on the first transmit symbol and/or the second transmit symbol includes any one of the following: dividing the first transmit symbol by a phase compensation factor; multiplying the second transmit symbol by the phase compensation factor; and multiplying the first transmit symbol by a first phase factor, and multiplying the second transmit symbol by a second phase factor, where a difference between the first phase factor and the second phase factor is the phase compensation factor.

It may be understood that any one of the foregoing operation processing may be performed on the transmit symbol on which the signal processing is performed.

Optionally, the phase compensation factor may be any one of the following:

$$e^{j2\pi f_0 \Delta f T_{CP,l}} \left[ \frac{t}{(N+N_{CP,l})T_c} \right], e^{j2\pi f_0 \Delta f T_{CP,l}}, \text{ or } e^{j\frac{2\pi f_0 \Delta f N_{CP}}{N}}.$$

It should be understood that the foregoing description is merely an example for description, and is not limited in this application, provided that after the phase adjustment, the symbol component of the first transmit symbol at the first reference point and the symbol component of the second transmit symbol at the second reference point are continuous. For example, alternatively, the first transmit symbol may be multiplied by a phase factor, and the second transmit symbol may be divided by another phase factor. For another example, alternatively, the first transmit symbol may be divided by a phase factor, and the second transmit symbol may be divided by another phase factor. For another example, alternatively, the first transmit symbol may be divided by a phase factor, and the second transmit symbol may be multiplied by another phase factor. For another example, another operation may be performed on the first transmit symbol and/or the second transmit symbol.

With reference to the third aspect, in a possible implementation of the third aspect, the performing signal processing on the first set and the second set includes: performing frequency domain processing on the first set and the second set to obtain the frequency domain signal corresponding to the first set and the frequency domain signal corresponding to the second set; performing IFFT on the frequency domain signal corresponding to the first set and the frequency domain signal corresponding to the second set, to obtain the time domain signal corresponding to the first set and the time domain signal corresponding to the second set; and performing the cyclic shift on the time domain signal corresponding to the first set and the time domain signal corresponding to the second set, to cause the start position of the first subset to correspond to the position before the first reference point of the first transmit symbol and the end position of the first subset to correspond to the position after the first reference point of the first transmit symbol, and cause the start position of the second subset to correspond to the position before the second reference point of the second transmit symbol and the end position of the second subset to correspond to the position after the second reference point of the second transmit symbol.

This implementation is applicable to a scenario in which the transmit symbol is a DFT-s-OFDM symbol.

In this application, after the IFFT, the cyclic shift is performed to cause the start position of the first subset to correspond to the position before the first reference point of the first transmit symbol and the end position of the first subset to correspond to the position after the first reference point of the first transmit symbol, and cause the start position of the second subset to correspond to the position before the second reference point of the second transmit symbol and the end position of the second subset to correspond to the position after the second reference point of the second transmit symbol. Therefore, adverse impact of a filter smearing effect on extension of an inter-symbol guard period can be reduced to some extent.

With reference to the third aspect, in a possible implementation of the third aspect, the performing signal processing on the first set and the second set includes: performing discrete Fourier transform (DFT) on the first set and the second set to obtain the frequency domain signal corresponding to the first set and the frequency domain signal corresponding to the second set; and performing the frequency domain weighting on the frequency domain signal corresponding to the first set and the frequency domain signal corresponding to the second set, to cause the start position of the first subset to correspond to the position before the first reference point of the first transmit symbol and the end position of the first subset to correspond to the position after the first reference point of the first transmit symbol, and cause the start position of the second subset to correspond to the position before the second reference point of the second transmit symbol and the end position of the second subset to correspond to the position after the second reference point of the second transmit symbol.

This implementation is applicable to a scenario in which the transmit symbol is a DFT-s-OFDM symbol.

In this application, after the DFT, the frequency domain weighting is performed to cause the start position of the first subset to correspond to the position before the first reference point of the first transmit symbol and the end position of the first subset to correspond to the position after the first reference point of the first transmit symbol, and cause the start position of the second subset to correspond to the position before the second reference point of the second transmit symbol and the end position of the second subset to correspond to the position after the second reference point of the second transmit symbol. Therefore, adverse impact of a filter smearing effect on extension of an inter-symbol guard period can be reduced to some extent.

With reference to the third aspect, in a possible implementation of the third aspect, the performing signal processing on the first set and the second set includes: directly performing the cyclic shift on the first set and the second set obtained by the copy operation, to cause the start position of the first subset to correspond to the position before the first reference point of the first transmit symbol and the end position of the first subset to correspond to the position after the first reference point of the first transmit symbol, and cause the start position of the second subset to correspond to the position before the second reference point of the second transmit symbol and the end position of the second subset to correspond to the position after the second reference point of the second transmit symbol.

This implementation is applicable to a scenario in which the transmit symbol is a DFT-s-OFDM symbol or an SC-QAM symbol.

With reference to the third aspect, in a possible implementation of the third aspect, the performing a copy operation on the first set and the second set includes: performing the copy operation on the first set and the second set, so that the time domain position of the first subset can be the same as the time domain position of the second subset, that is, a time domain index of the start position of the first subset is the same as a time domain index of the start position of the second subset, and a time domain index of the end position of the first subset is the same as a time domain index of the end position of the second subset.

The copy operation in this implementation is referred to as an intra-position copy operation.

With reference to the third aspect, in a possible implementation of the third aspect, in the process of performing the copy operation on the first set and the second set, a time domain index of the start position of the first subset is related to a CP length and a symbol number.

Optionally, in the process of performing the copy operation on the first set and the second set, the time domain index i of the start position of the first subset satisfies the following formula:

$$i = A + CL_{CP}(l),$$

where l represents a symbol number of the first set, A represents a time domain index of a subset participating in the copy operation in the first set whose symbol number l is 0, and $CL_{CP}(l)$ represents an equivalent cumulative CP length of the first set whose symbol number is l.

It should be understood that, in this application, a copy operation may be performed on sets corresponding to a plurality of continuous transmit symbols.

With reference to the third aspect, in a possible implementation of the third aspect, the first subset and the second subset have a same length, but do not have a same index. For example, the time domain position of the first subset is different from the time domain position of the second subset. In this case, a transmitter may perform processing such as the cyclic shift or frequency domain weighting in a subsequent processing step to adjust the first subset and the second subset to a same time domain position, and this is equivalent to intra-position copy.

With reference to the third aspect, in a possible implementation of the third aspect, the performing a copy operation on the first set and the second set includes: copying the first complex-valued symbol in the first set to the second set.

The copy mode in this implementation may be referred to as backward copy.

Optionally, in this implementation, the first transmit symbol is a reference signal, and the second transmit symbol is a non-reference signal.

With reference to the third aspect, in a possible implementation of the third aspect, the performing a copy operation on the first set and the second set includes: copying the first complex-valued symbol in the second set to the first set.

The copy mode in this implementation may be referred to as forward copy.

Optionally, in this implementation, the first transmit symbol is a non-reference signal, and the second transmit symbol is a reference signal.

According to a fourth aspect, a symbol processing method is provided. The method includes: obtaining a plurality of complex-valued symbols; grouping the plurality of complex-valued symbols into a plurality of sets, where the plurality of sets include a first set and a second set, the first set corresponds to a first transmit symbol, the second set corresponds to a second transmit symbol, the first transmit symbol and the second transmit symbol are continuous in time domain, the first transmit symbol is located before the second transmit symbol, and a complex-valued symbol in a first subset in the first set is the same as a complex-valued symbol in a second subset in the second set; performing signal processing on the first set and the second set to generate the first transmit symbol and the second transmit symbol, where the signal processing includes a cyclic shift or frequency domain weighting, and the signal processing causes a start position of the first subset to correspond to a position before a first reference point of the first transmit symbol and an end position of the first subset to correspond to a position after the first reference point of the first transmit symbol, and causes a start position of the second subset to correspond to a position before a second reference point of the second transmit symbol and an end position of the second subset to correspond to a position after the second reference point of the second transmit symbol, where the first reference point represents an end position of the transmit symbol, and the second reference point represents a position of a truncated CP of the transmit symbol; and performing a phase adjustment on the first transmit symbol and/or the second transmit symbol, so that a symbol component whose end position is the first reference point in the first transmit symbol is the same as a symbol component whose end position is the second reference point in the second transmit symbol after the adjustment.

Optionally, both the first transmit symbol and the second transmit symbol are reference signals, for example, demodulation reference signals (DMRSs).

It should be understood that, in this application, no copy operation is performed on the first set and the second set. When the transmit symbols corresponding to the first set and the second set are reference signals, it can be ensured that guard periods of the reference signals can be flexibly configured while accuracy of the reference signals is ensured.

With reference to the fourth aspect, in a possible implementation of the fourth aspect, the performing a phase adjustment on the first transmit symbol and/or the second transmit symbol includes: performing the phase adjustment on the first transmit symbol and/or the second transmit symbol based on one or more of the following information: an IFFT size, a CP length, a frequency resource position, a subcarrier center position, a subcarrier spacing, a sampling interval, a transmit symbol period, and a transmit symbol index.

With reference to the fourth aspect, in a possible implementation of the fourth aspect, the performing a phase adjustment on the first transmit symbol and/or the second transmit symbol includes: performing the phase adjustment on the first transmit symbol and/or the second transmit symbol based on a phase difference between the first transmit symbol and the second transmit symbol.

In this application, based on a phase difference between two adjacent transmit symbols, a phase adjustment may be performed on the two transmit symbols or either of the two transmit symbols, so that symbol components shared by the two transmit symbols have a same phase.

With reference to the fourth aspect, in a possible implementation of the fourth aspect, the phase difference between the first transmit symbol and the second transmit symbol satisfies either of the following formulas:

$$e^{\left(j\frac{2\pi f_0 \Delta f T_{CP,l}}{N}\right)} \text{ or } e^{\left(j\frac{2\pi f_0 \Delta f N_{CP,l}}{N}\right)},$$

where $f_0$ represents the subcarrier center position, $\Delta f$ represents the subcarrier spacing, $T_{CP,l}$ represents duration of a CP of an $l^{th}$ transmit symbol, $N_{cp,l}$ represents a quantity of sampling points of the CP of the $l^{th}$ transmit symbol, l represents the transmit symbol index, j represents a complex-valued symbol, and N represents the IFFT size.

With reference to the fourth aspect, in a possible implementation of the fourth aspect, the performing a phase adjustment on the first transmit symbol and/or the second transmit symbol includes any one of the following: dividing the first transmit symbol by a phase compensation factor; multiplying the second transmit symbol by the phase compensation factor; and multiplying the first transmit symbol by a first phase factor, and multiplying the second transmit symbol by a second phase factor, where a difference between the first phase factor and the second phase factor is the phase compensation factor.

Optionally, the phase compensation factor may be any one of the following:

$$e^{j2\pi f_0 \Delta f T_{CP,l}} \left[ \frac{t}{(N+N_{CP,l})T_c} \right], e^{j2\pi f_0 \Delta f T_{CP,l}} \text{ or } e^{j\frac{2\pi f_0 \Delta f N_{CP}}{N}}.$$

With reference to the fourth aspect, in a possible implementation of the fourth aspect, the performing signal processing on the first set and the second set includes: performing frequency domain processing on the first set and the second set to obtain a frequency domain signal corresponding to the first set and a frequency domain signal corresponding to the second set; performing IFFT on the frequency domain signal corresponding to the first set and the frequency domain signal corresponding to the second set, to obtain a time domain signal corresponding to the first set and a time domain signal corresponding to the second set; and performing the cyclic shift on the time domain signal corresponding to the first set and the time domain signal corresponding to the second set, to cause the start position of the first subset to correspond to the position before the first reference point of the first transmit symbol and the end position of the first subset to correspond to the position after the first reference point of the first transmit symbol, and cause the start position of the second subset to correspond to the position before the second reference point of the second transmit symbol and the end position of the second subset to correspond to the position after the second reference point of the second transmit symbol.

This implementation is applicable to a scenario in which a waveform of the transmit symbol is a DFT-s-OFDM waveform.

In this application, after the IFFT, the cyclic shift is performed to cause the start position of the first subset to correspond to the position before the first reference point of the first transmit symbol and the end position of the first subset to correspond to the position after the first reference point of the first transmit symbol, and cause the start position of the second subset to correspond to the position before the second reference point of the second transmit symbol and the end position of the second subset to correspond to the position after the second reference point of the second transmit symbol. Therefore, adverse impact of a filter smearing effect on extension of an inter-symbol guard period can be reduced to some extent.

With reference to the fourth aspect, in a possible implementation of the fourth aspect, the performing signal processing on the first set and the second set includes: performing DFT on the first set and the second set to obtain a frequency domain signal corresponding to the first set and a frequency domain signal corresponding to the second set; and performing the frequency domain weighting on the frequency domain signal corresponding to the first set and the frequency domain signal corresponding to the second set, to cause the start position of the first subset to correspond to the position before the first reference point of the first transmit symbol and the end position of the first subset to correspond to the position after the first reference point of the first transmit symbol, and cause the start position of the second subset to correspond to the position before the second reference point of the second transmit symbol and the end position of the second subset to correspond to the position after the second reference point of the second transmit symbol.

This implementation is applicable to a scenario in which the transmit symbol is a DFT-s-OFDM symbol.

In this application, after the DFT, the frequency domain weighting is performed to cause the start position of the first subset to correspond to the position before the first reference point of the first transmit symbol and the end position of the first subset to correspond to the position after the first reference point of the first transmit symbol, and cause the start position of the second subset to correspond to the position before the second reference point of the second transmit symbol and the end position of the second subset to correspond to the position after the second reference point of the second transmit symbol. Therefore, adverse impact of a filter smearing effect on extension of an inter-symbol guard period can be reduced to some extent.

With reference to the fourth aspect, in a possible implementation of the fourth aspect, the performing signal processing on the first set and the second set includes: directly performing the cyclic shift on the first set and the second set obtained by the copy operation, to cause the start position of the first subset to correspond to the position before the first reference point of the first transmit symbol and the end position of the first subset to correspond to the position after the first reference point of the first transmit symbol, and cause the start position of the second subset to correspond to the position before the second reference point of the second transmit symbol and the end position of the second subset to correspond to the position after the second reference point of the second transmit symbol.

This implementation is applicable to a scenario in which the transmit symbol is a DFT-s-OFDM symbol or an SC-QAM symbol.

According to a fifth aspect, a symbol processing method is provided. The method includes: receiving a first transmit symbol and a second transmit symbol, where a transmit symbol component whose end position is a first reference point in the first transmit symbol is the same as a transmit symbol component whose end position is a second reference point in the second transmit symbol, the first reference point represents an end position of the transmit symbol, the second reference point represents a position of a truncated CP of the transmit symbol, the first transmit symbol and the second transmit symbol are continuous in time domain, and the first transmit symbol is located before the second transmit symbol;

and performing a phase adjustment on the first transmit symbol and/or the second transmit symbol.

According to a sixth aspect, a symbol processing apparatus is provided, and the apparatus is configured to perform the method provided in any one of the first aspect to the fifth aspect.

Optionally, the apparatus may include a module configured to perform the method provided in any one of the first aspect to the fifth aspect.

According to a seventh aspect, a symbol processing apparatus is provided. The apparatus includes a memory and a processor. The memory is configured to store instructions. The processor is configured to execute the instructions stored in the memory, and execution of the instructions stored in the memory enables the processor to perform the method provided in any one of the first aspect to the fifth aspect.

According to an eighth aspect, a chip is provided. The chip includes a processing module and a communications interface. The processing module is configured to control the communications interface to communicate with the outside, and the processing module is further configured to implement the method provided in any one of the first aspect to the fifth aspect.

According to a ninth aspect, a computer-readable storage medium is provided. The computer-readable storage medium stores a computer program, and when the computer program is executed by a computer, the computer is enabled to implement the method provided in any one of the first aspect to the fifth aspect.

According to a tenth aspect, a computer program product including instructions is provided. When the instructions are executed by a computer, the computer is enabled to implement the method provided in any one of the first aspect to the fifth aspect.

DESCRIPTION OF EMBODIMENTS

The following describes technical solutions of this application with reference to the accompanying drawings.

Unless otherwise defined, all technical and scientific terms used in this specification have same meanings as those usually understood by a person skilled in the art of this application. The terms used in the specification of this application are merely for the purpose of describing specific embodiments, and are not intended to limit this application.

Single-carrier waveforms such as DFT-s-OFDM or SC-QAM have a lower peak to average power ratio (PAPR) than multi-carrier waveforms such as orthogonal frequency division multiplexing (OFDM). Therefore, with a same power amplifier, the single-carrier waveforms can provide higher output power and higher power amplification efficiency, thereby improving coverage and reducing energy consumption. Therefore, the single-carrier waveforms such as DFT-s-OFDM or SC-QAM are widely applied in various communications systems, such as a long term evolution (LTE) system, a 5th generation (5G) system, or a new radio (NR) system.

DFT-s-OFDM is discrete Fourier transform-spread-orthogonal frequency division multiplexing (DFT-s-OFDM). SC-QAM is single carrier-quadrature amplitude modulation (SC-QAM).

In both NR and LTE, a CP is used as an inter-symbol (DFT-s-OFDM symbol) guard period for a DFT-s-OFDM waveform.

Figure 1:
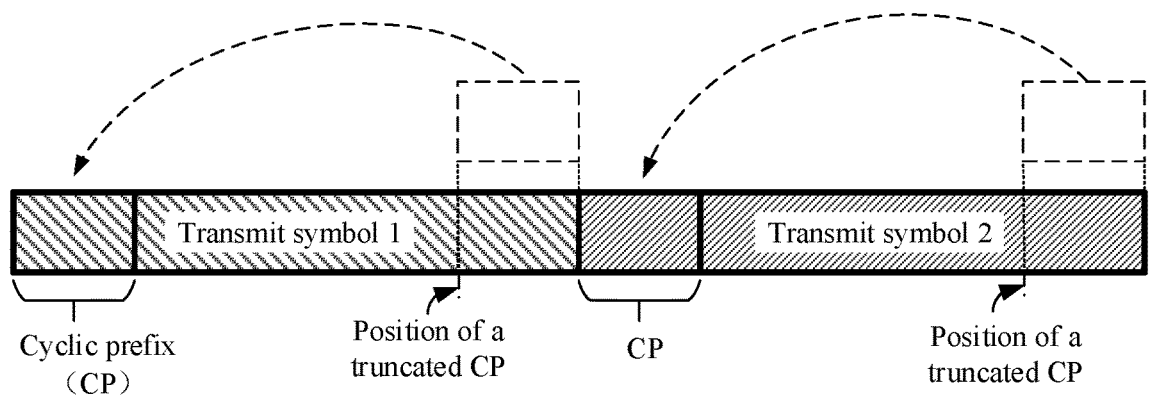
FIG. 1 and FIG. 2 are schematic diagrams of using a CP as an inter-symbol guard period.

FIG. 1 is a schematic diagram of a time domain structure of a cyclic prefix (denoted as a CP below) used as an inter-symbol guard period. In FIG. 1, two transmit symbols are given: a transmit symbol 1 and a transmit symbol 2. A CP of the transmit symbol 1 refers to a cyclic structure obtained by copying, to a position before the transmit symbol 1, a transmit symbol component between a position of a truncated CP in the transmit symbol 1 and an end position of the transmit symbol 1. Similarly, a CP of the transmit symbol 2 refers to a cyclic structure obtained by copying, to a position before the transmit symbol 2, a transmit symbol component between a position of a truncated CP in the transmit symbol 2 and an end position of the transmit symbol 2.

The CP of the transmit symbol 2 is used as a guard period between the transmit symbol 1 and the transmit symbol 2, and the CP of the transmit symbol 1 is used as a guard period between the transmit symbol 1 and a transmit symbol (not shown in FIG. 1) before the transmit symbol 1.

Figure 2:
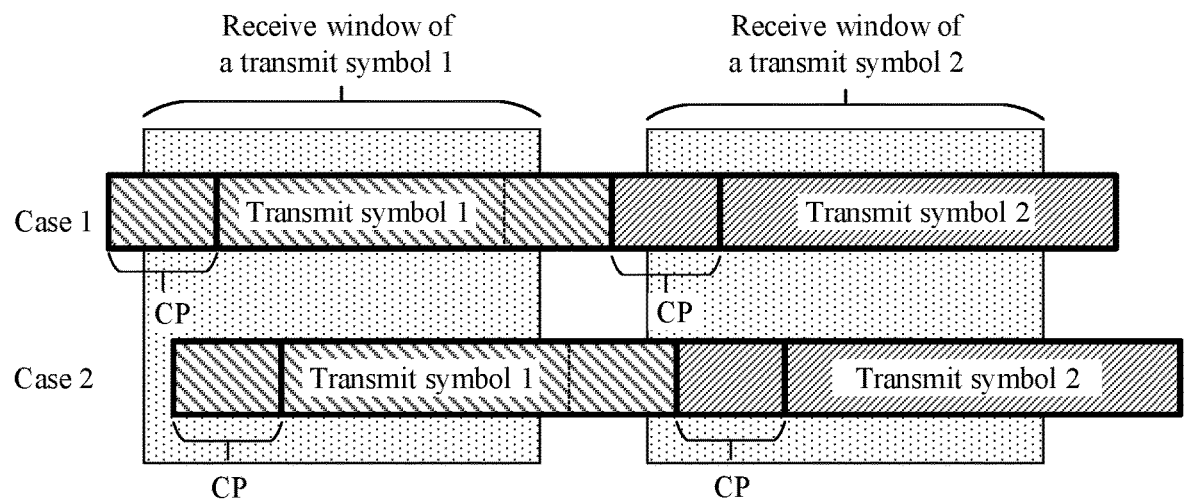

FIG. 2 shows reception of the transmit symbol 1 and the transmit symbol 2 that are shown in FIG. 1 and that are after channel transmission at a receive end (as an example, FIG. 2 shows only a maximum channel multipath delay).

Case 1 indicates that a maximum channel multipath delay does not exceed a CP length. In the case 1, because of protection of the CP, a receive window of each transmit symbol does not include ISI of another transmit symbol. As shown in FIG. 2, because a receive window of the transmit symbol 2 does not include the transmit symbol 1, ISI of the transmit symbol 1 can be avoided; and because a receive window of the transmit symbol 1 does not include a transmit symbol (not shown in FIG. 2) before the transmit symbol 1 either, the transmit symbol 1 does not suffer ISI either. In addition, in the case 1, in the receive window of each transmit symbol, a receive symbol is a cyclic convolution of the transmit symbol and the channel, so that the receive end can eliminate a channel multipath effect by using a frequency domain equalization method.

Case 2 indicates that a maximum channel multipath delay exceeds a CP length. In the case 2, because the channel delay exceeds the CP length, a receive window of one transmit symbol includes another transmit symbol. As shown in FIG. 2, a receive window of the transmit symbol 2 includes a segment of transmit symbol component of the transmit symbol 1, so that the transmit symbol 2 is interfered by ISI of the transmit symbol 1; and a receive window of the transmit symbol 1 may also include a transmit symbol (not shown in FIG. 2) before the transmit symbol 1, so that the transmit symbol 1 is also interfered by ISI. In addition, in the case 2, in the receive window of each transmit symbol, a receive symbol is no longer a cyclic convolution of the transmit symbol and the channel, and this is unfavorable for eliminating a channel multipath effect by the receive end.

The transmit symbol mentioned in the foregoing description indicates a symbol sent by a transmit end, and the receive symbol indicates a symbol received by the receive end.

It can be learned from FIG. 2 that a CP length required by a channel condition in the case 2 is greater than a CP length required by a channel condition in the case 1. In other words, different channel conditions may require different CP lengths.

It can be learned from FIG. 1 or FIG. 2 that the CP length affects a frame structure. Due to reasons such as transceiver complexity and out-of-band interference, (frequency division, space division, and time division) multiplexing between users with different CP lengths has less flexibility. During implementation, to perform flexible multi-user multiplexing, a network device usually configures a same CP length for different users. However, as shown in FIG. 2, user equipment with different channel conditions may require different CP lengths.

Figure 3:
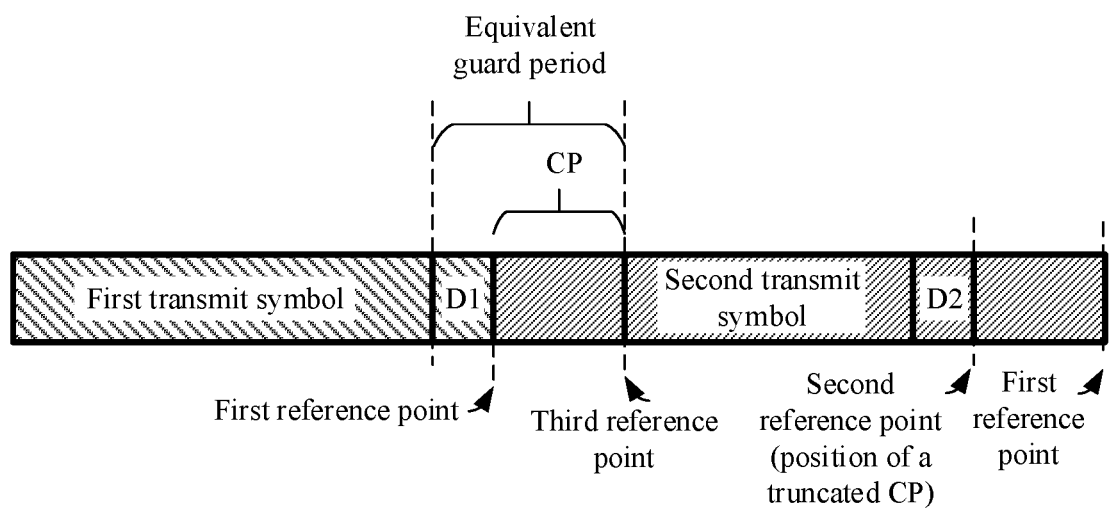
FIG. 3 and FIG. 4 are schematic diagrams of flexible configurations of inter-symbol guard periods applicable to an embodiment of this application.

To overcome the problem shown in FIG. 2, that is, to ensure performance of all users in different channel conditions, a possible implementation is shown in FIG. 3.

For example, a schematic diagram of time domain structures of the first transmit symbol and the second transmit symbol is shown in FIG. 3. A symbol component D1 in the first transmit symbol is the same as a symbol component D2 in the second transmit symbol, an end position of the symbol component D1 in the first transmit symbol is a first reference point, and an end position of the symbol component D2 in the second transmit symbol is a second reference point. The first reference point represents an end position of the transmit symbol, and the second reference point represents a position of a truncated CP in the transmit symbol.

As shown in FIG. 3, the symbol component D1 in the first transmit symbol and the CP of the second transmit symbol may be considered together as an equivalent guard period between the first transmit symbol and the second transmit symbol. It can be learned that, according to the solution shown in FIG. 3, when the CP length is fixed, the inter-symbol guard period can also be flexibly configured.

Figure 4:
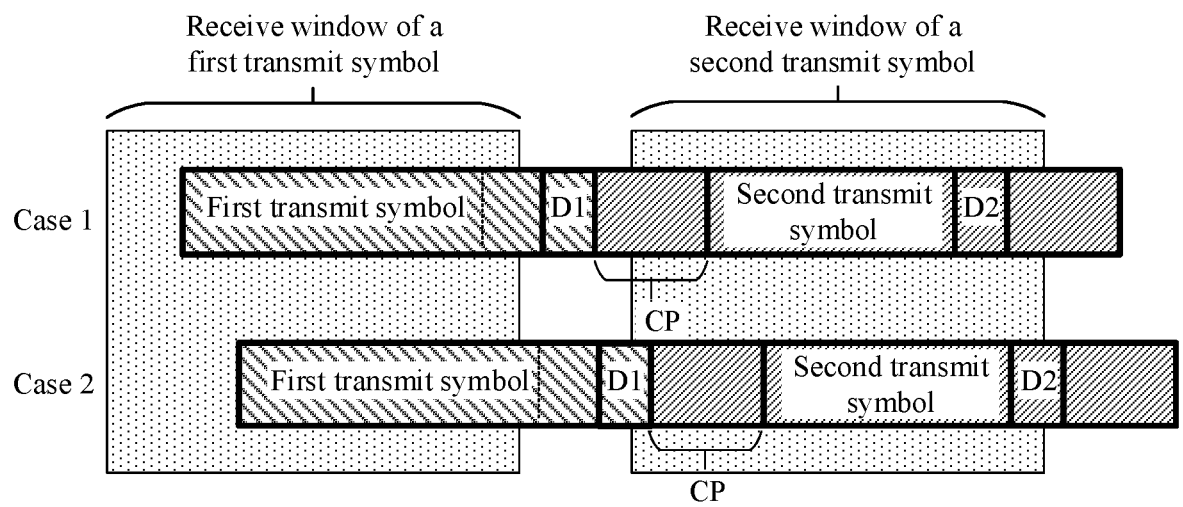

FIG. 4 shows reception of the first transmit symbol and the second transmit symbol shown in FIG. 3 (after channel transmission) at a receive end (corresponding to a transmit end).

Case 1 indicates that a maximum channel multipath delay does not exceed a CP length. In the case 1, because of protection of the CP, a receive window of each transmit symbol does not include ISI of another transmit symbol. As shown in FIG. 4, a receiving window of the second transmit symbol does not include a component of the first transmit symbol, so that ISI of the first transmit symbol can be avoided.

Case 2 indicates that a maximum channel multipath delay exceeds a CP length. In the case 2, because the channel delay exceeds the CP length, a receive window of one transmit symbol may include another transmit symbol. As shown in FIG. 4, the symbol component D1 of the first transmit symbol enters the receive window of the second transmit symbol; however, because the symbol component D1 of the first transmit symbol is the same as the symbol component D2 of the second transmit symbol, "the symbol component D1 of the first transmit symbol enters the receive window of the second transmit symbol" is equivalent to "the symbol component D2 of the second transmit symbol enters the receive window of the second transmit symbol". In addition, because the symbol component D2 is continuous with a symbol component used as the CP in the second transmit symbol, based on the principle that the CP of the second transmit symbol does not cause ISI to the second transmit symbol, the symbol component D1 of the first transmit symbol entering the receive window of the second transmit symbol does not cause the ISI to the second transmit symbol either.

It can be learned from FIG. 3 and FIG. 4 that even if the CP length is fixed, flexibly configuring a length of the symbol component D1 (also equivalent to flexibly configuring a length of the symbol component D2) can make a sum of the length of the symbol component D1 and the CP length greater than the channel delay, so that a channel multipath effect can be resisted.

However, the foregoing solution does not consider a problem of extended CP discontinuity in non-zero frequency transmission.

Figure 5:
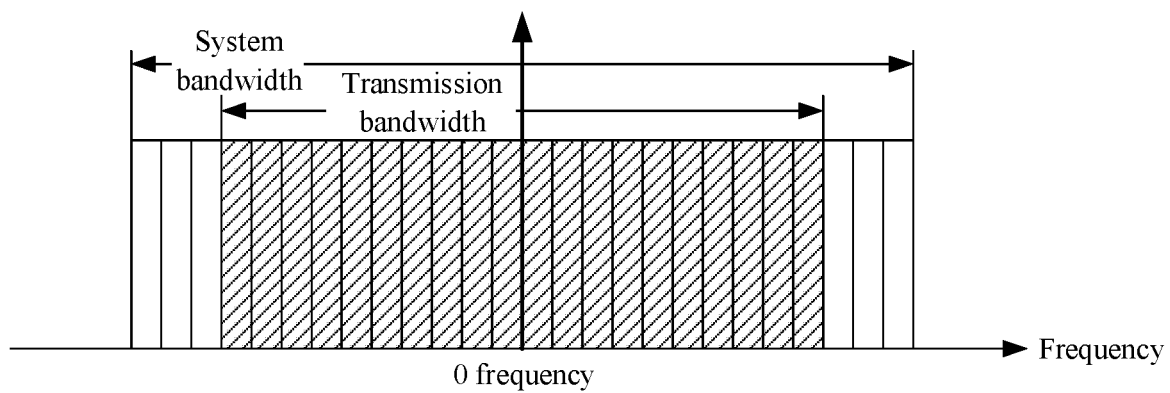
FIG. 5 is a schematic diagram of zero frequency transmission.

In baseband processing, if a center frequency of a transmission bandwidth is at a position 0, the transmission is zero frequency transmission. FIG. 5 is a schematic diagram of zero frequency transmission.

Figure 6:
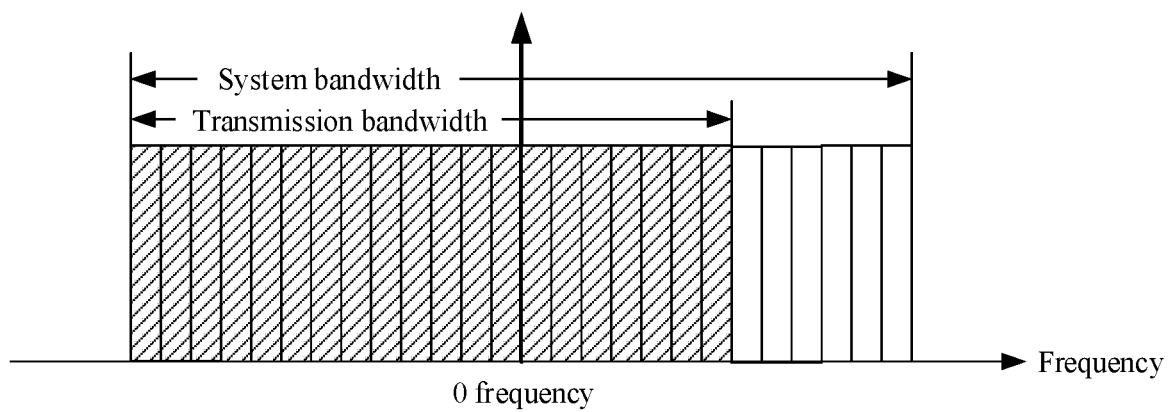
FIG. 6 is a schematic diagram of non-zero frequency transmission.

In baseband processing, if the center frequency of the transmission bandwidth is not at the position 0, the transmission is non-zero frequency transmission. FIG. 6 is a schematic diagram of non-zero frequency transmission. Non-zero frequency transmission is a common transmission mode.

Figure 7:
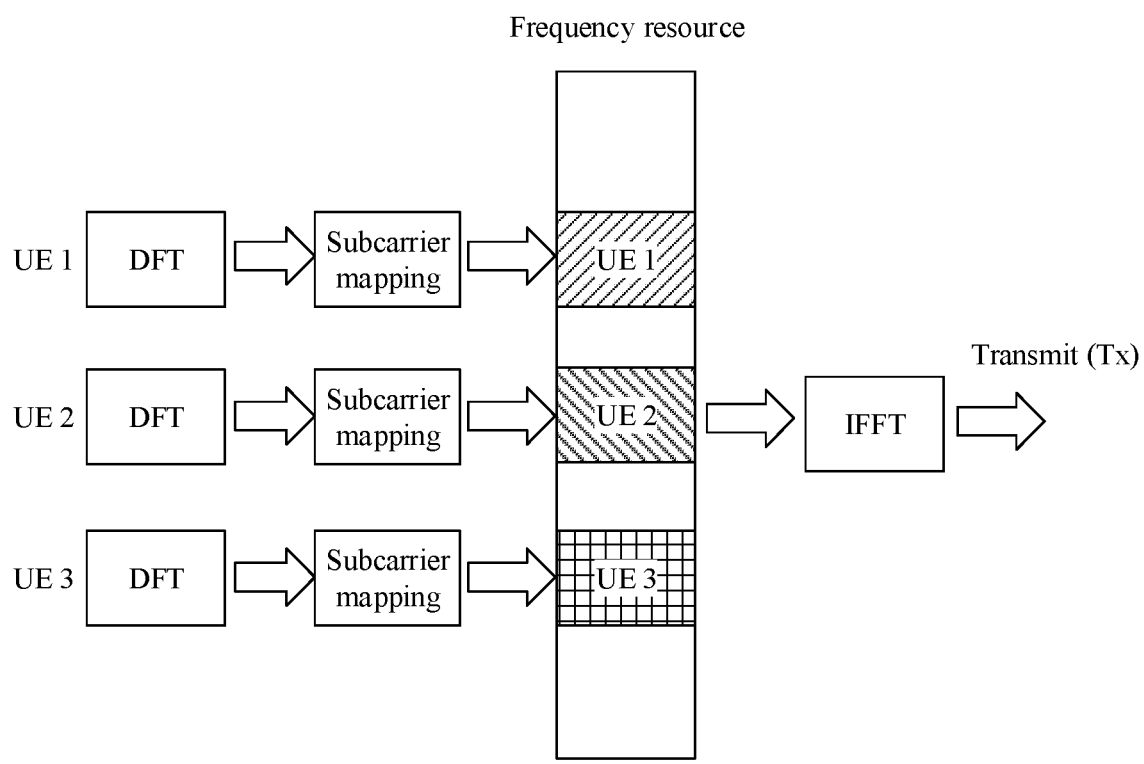
FIG. 7 is a schematic diagram of multi-user multiplexing downlink DFT-s-OFDM transmission.

For example, as shown in FIG. 7, multi-user multiplexing downlink DFT-s-OFDM transmission is used as an example. It is assumed that a plurality of users include UE 1, UE 2, and UE 3.

The plurality of users may not all use DFT-s-OFDM transmission. Possibly, some users use OFDM, and some users use DFT-s-OFDM. In this scenario, considering that resources allocated to a user are generally continuous, and that frequency resources (frequency resource) symmetrical about a zero frequency are not allocated, it can be learned that only one user can use zero frequency transmission. A majority of other users use non-zero frequency transmission.

Figure 8:
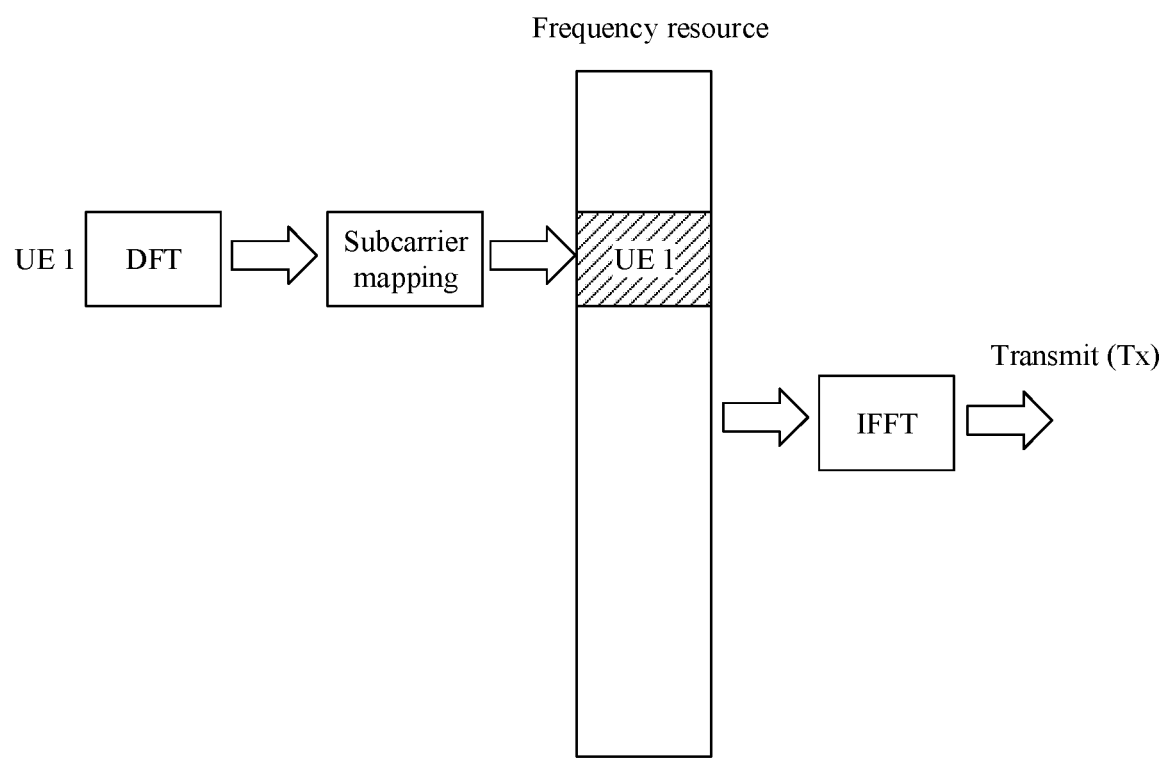
FIG. 8 is a schematic diagram of single-user uplink DFT-s-OFDM transmission.

For another example, as shown in FIG. 8, single-user uplink DFT-s-OFDM transmission is used as an example. If a network device configures a non-zero frequency resource for a user, the user also uses non-zero frequency transmission.

It can be learned that non-zero frequency transmission may be used regardless of uplink transmission, downlink transmission, multi-user multiplexing downlink transmission, or single-user uplink transmission.

When DFT-s-OFDM is used as a transmission waveform and the flexible CP transmission solution shown in FIG. 3 is used, the solution shown in FIG. 3 is invalid.

First, a DFT operation is performed on a signal. Assuming that a quantity of points of DFT performed by a transmit end is M, it can be learned that a signal after the DFT may be expressed as:

$$a_k = \frac{1}{\sqrt{M}} \sum_{n'=0}^{M-1} s_{n'} e^{-j\frac{2\pi k n'}{M}}, 0 \leq k \leq M-1,$$

where j represents a complex-valued symbol, that is, j= $\sqrt{-1}$, and $S_{n'}$ represents a temporally continuous signal of a symbol n'.

The signal after the DFT is mapped, and IFFT is performed. Assuming that a size of the IFFT performed by the transmit end is N, a final time domain signal may be obtained, and the time domain signal may be expressed as:

$$x_n = \frac{1}{\sqrt{N}} \sum_{k=0}^{M-1} a_k e^{j\frac{2\pi f_k n}{N}}, 0 \leq n \leq N-1,$$

where $f_k$ is an index of a $k^{th}$ input of N-point IFFT to which a signal after M-point DFT is mapped, and j represents the complex signal, that is, j=$\sqrt{-1}$. It should be understood that, for meanings of the parameters in the foregoing formula, reference may be made to an existing protocol.

After the two formulas are combined, a relationship between the final time domain signal and a transmit signal may be obtained.

When zero frequency transmission is used, that is, when the center frequency $f_0$ is equal to 0, there is no phase deflection. When non-zero frequency transmission is used, that is, when the center frequency $f_0$ is not equal to 0, the time-domain signal is multiplied by a phase $$e^{j\frac{2\pi f_0 n}{N}}.$$

For a conventional transmission mode, the phase has no adverse impact on signal demodulation, because the phase can be eliminated as a common phase during channel estimation and equalization. However, when the solution shown in FIG. 3 needs to be used, the phase causes phase discontinuity between symbols, and consequently, the solution shown in FIG. 3 is invalid.

This application provides a symbol processing method and apparatus, to resolve a problem that in an existing single-carrier system with a flexible-length guard period (for example, the system may include but is not limited to DFT-s-OFDM or SC-QAM), the flexible-length guard period becomes invalid due to phase discontinuity when information is placed at a non-zero frequency bandwidth.

The technical solutions in the embodiments of this application may be applied to various communications systems, for example, a cellular communications system such as LTE or a system evolved therefrom, a 5G system or an NR system, a machine to machine (M2M) communications system, and other future evolved communications systems.

An embodiment of this application provides a symbol processing method. The method includes: performing a phase adjustment on a first transmit symbol and/or a second transmit symbol, so that a symbol component whose end position is a first reference point in the first transmit symbol is the same as a symbol component whose end position is a second reference point in the second transmit symbol after the adjustment, where the first reference point represents an end position of the transmit symbol, the second reference point represents a position of a truncated CP of the transmit symbol, the first transmit symbol and the second transmit symbol are continuous in time domain, and the first transmit symbol is located before the second transmit symbol.

Because the phase adjustment is performed on the first transmit symbol and/or the second transmit symbol, the symbol component of the first transmit symbol at the first reference point and the symbol component of the second transmit symbol at the second reference point are continuous. In other words, because the phase adjustment is performed on the first transmit symbol and/or the second transmit symbol, a symbol component whose end position is the first reference point in the first transmit symbol is the same as a symbol component whose end position is the second reference point in the second transmit symbol. As shown in FIG. 3 or FIG. 4, the signal component D1 of the first transmit symbol is the same as the signal component D2 of the second transmit symbol.

For example, the performing a phase adjustment on a first transmit symbol and/or a second transmit symbol may include: performing the phase adjustment on the first transmit symbol by using a phase compensation factor; or performing the phase adjustment on the second transmit symbol by using a phase compensation factor; or performing the phase adjustment on both the first transmit symbol and the second transmit symbol by using a phase compensation factor.

It should be noted that, in the foregoing description with reference to FIG. 3, it is mentioned that "a symbol component D1 of the first transmit symbol and a symbol component D2 of the second transmit symbol are the same". The "same" herein is not necessarily the same in an absolute sense, and may also represent approximately the same. It should be understood that, due to a filter smearing effect, there may be a slight deviation between the symbol component D1 of the first transmit symbol and the symbol component D2 of the second transmit symbol.

The symbol processing method provided in this application may be implemented by a transmit end, for example, may be implemented by a transmitter or a circuit used to implement a transmitter. The transmit end may be a terminal device, or may be a network device.

The transmit symbol in this embodiment of this application may be an uplink waveform symbol and/or a downlink waveform symbol in a communications system.

In this application, because the phase adjustment is performed on the transmit symbols, for transmit signals continuous in time domain, for example, the first transmit symbol and the second transmit symbol, the symbol component whose end position is the first reference point in the first transmit symbol is the same as the symbol component whose end position is the second reference point in the second transmit symbol. Therefore, not only a length of a guard period can be flexibly configured, but also a problem that the flexible-length guard period is invalid in some scenarios, for example, a non-zero frequency transmission scenario, can be avoided. In this way, implementation of the solution shown in FIG. 3 is ensured.

In addition, it should be understood that the length of the symbol component shared between the first transmit symbol and the second transmit symbol does not affect a frame structure of the transmit symbol. Therefore, for users with different channel conditions, by configuring different lengths for the shared symbol components. First, the inter-symbol guard period can be flexibly configured. Second, (frequency division, space division, and time division) multiplexing can also be performed among users configured with different guard periods.

Therefore, in this application, when a CP length is fixed, the inter-symbol guard period can be flexibly configured, the length of the guard period can be flexibly configured based on a user requirement, and further, the problem that the flexible-length guard period is invalid can be avoided.

It should be noted that the length mentioned in this specification, for example, the CP length and the length of the symbol component, all refer to duration. For example, a unit of the length (that is, duration) mentioned in this specification is $T_c=1/(4096 \cdot 480 \cdot 10^3)$ seconds. For another example, the time length may alternatively be represented by a quantity of time domain sampling points.

It should be further noted that, for ease of understanding and description rather than limitation, in this specification, three reference points are defined for the transmit symbol: a first reference point, a second reference point, and a third reference point (which will be mentioned in the following embodiments), as shown in FIG. 3. The first reference point represents an end position of the transmit symbol, the second reference point represents a position of a truncated CP in the transmit symbol, and the third reference point represents a start position of the transmit symbol. The length of the distance between the second reference point and the end position of the transmit symbol is equal to the CP length. The start position of the transmit symbol refers to the start position of the transmit symbol itself, not a start position of the CP of the transmit symbol, or it may be understood from another perspective as that the start position of the transmit symbol refers to an end position of the CP of the transmit symbol.

It should be further noted that a plurality of symbol components (for example, the symbol component D1 and the symbol component D2 described above) mentioned for a plurality of times in this embodiment of this application are the same. That the symbol components are the same may indicate that the symbol components include same content and that the symbol components have same duration.

It should be further noted that all positions mentioned in this specification refer to time domain positions.

The following describes content related to a generation process of a transmit symbol.

Figure 9:
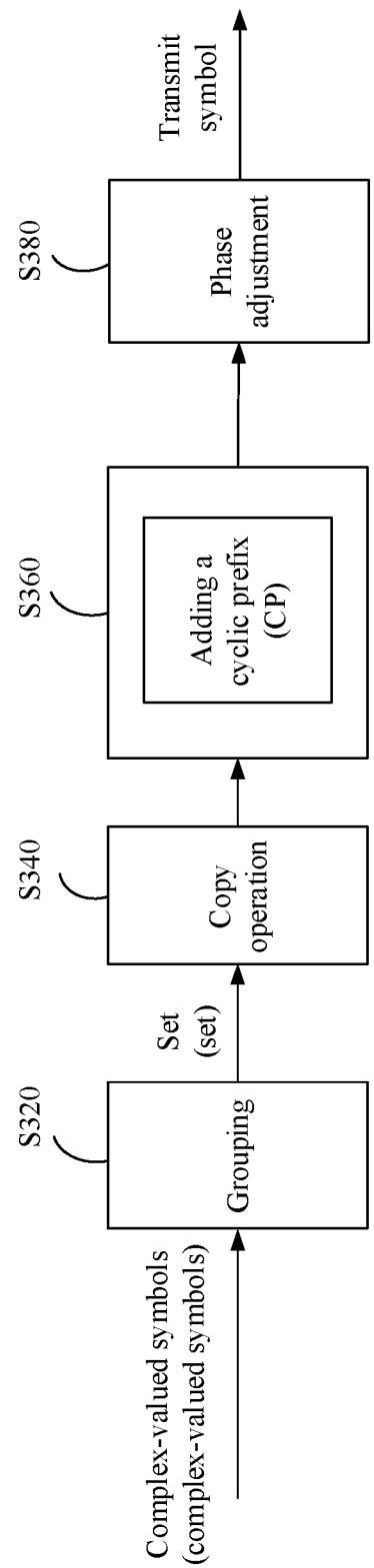
FIG. 9 is a basic flowchart of a symbol processing method according to an embodiment of this application.

FIG. 9 is a schematic diagram of a basic symbol processing procedure according to an embodiment of this application. As shown in FIG. 9, the procedure may include the following steps S320, S340, S360, and S380.

S320: Group a plurality of complex-valued symbols (complex-valued symbols) to obtain a plurality of sets (sets), where each set corresponds to one transmit symbol.

In other words, the plurality of complex-valued symbols are divided into (be divided into) a plurality of sets, and each set corresponds to one transmit symbol.

For ease of differentiation rather than limitation, the following convention is made for naming a signal in this specification: A signal to be grouped (or categorized) into a set is referred to as a complex-valued symbol; a signal obtained by grouping (or dividing) complex-valued symbols is referred to as a set; a set consisting of a part of the complex-valued symbols in the set is referred to as a subset; and a signal sent by a transmit end is referred to as a transmit symbol.

It should be understood that these names are merely intended for ease of understanding and differentiation, rather than limitation. For example, in a future technology evolution process, signals obtained at different stages of a symbol generation procedure may have other names.

The plurality of complex-valued symbols may include a modulated symbol obtained by modulating an encoded bit stream.

A modulation scheme for modulating the encoded bit stream may include pi/2-binary phase shift keying (BPSK), quadrature phase shift keying (QPSK), 16 quadrature amplitude modulation (QAM), 64QAM, 256QAM, phase shift keying (PSK), amplitude phase shift keying (APSK), non-uniform QAM, and the like.

Optionally, the plurality of complex-valued symbols may further include a reference signal sampling point. For example, the reference signal sampling point may include a phase tracking reference signal (PTRS) sampling point and the like.

That each set corresponds to one transmit symbol means that each finally generated transmit symbol is generated based on a corresponding set. For example, each set corresponds to a DFT-s-OFDM symbol or an SC-QAM symbol.

Each set may include several complex-valued symbols. For example, each set may be considered as a multidimensional time domain vector, and a complex-valued symbol in the set may be considered as an element in the time domain vector.

S340: Perform a copy operation on the plurality of sets obtained in step S320, so that two sets corresponding to two transmit symbols continuous in time domain have a part of same complex-valued symbols.

In this application, the copy operation may be performed on the sets in a plurality of modes, as described below.

S360: Process the plurality of sets obtained in step S360 to obtain a plurality of transmit symbols, where the processing includes adding a CP.

Alternatively, in step S360, the CP is added based on the set that is after the copying operation and that is obtained in step S340, and then other operations are performed to obtain the transmit symbol. The other operations herein include, but are not limited to: fast Fourier transform, carrier mapping, sampling, filtering, and the like.

It should be understood that, because the two sets corresponding to the two transmit symbols continuous in time domain have a part of same complex-valued symbols, time domain structures of the two transmit symbols corresponding to the two sets can be implemented to some extent, as shown in FIG. 3.

Therefore, in this embodiment of this application, the copy operation is performed on the two sets corresponding to the two transmit symbols continuous in time domain, so that the two sets have the same complex-valued symbols. This helps generate transmit symbols having the time domain structures shown in FIG. 3. Therefore, given a fixed CP length, an inter-symbol guard period can be flexibly configured.

In some scenarios, for example, non-zero frequency transmission, because a time domain signal further needs to be multiplied by a phase factor, for example, $$e^{j\frac{2\pi f_0 n}{N}},$$

the phase causes inter-symbol phase discontinuity, and consequently, the copy operation in step S340 fails, that is, the inter-symbol guard period cannot be flexibly configured. Therefore, the method may further include S380.

S380: Perform a phase adjustment.

The phase adjustment is performed on a first transmit symbol and/or a second transmit symbol, so that a symbol component whose end position is a first reference point in the first transmit symbol is the same as a symbol component whose end position is a second reference point in the second transmit symbol after the adjustment. In other words, the phase adjustment is performed on transmit symbols obtained after signal processing, and after the phase adjustment, the symbol component whose end position is the first reference point in the first transmit symbol is the same as the symbol component whose end position is the second reference point in the second transmit symbol.

Figure 10:
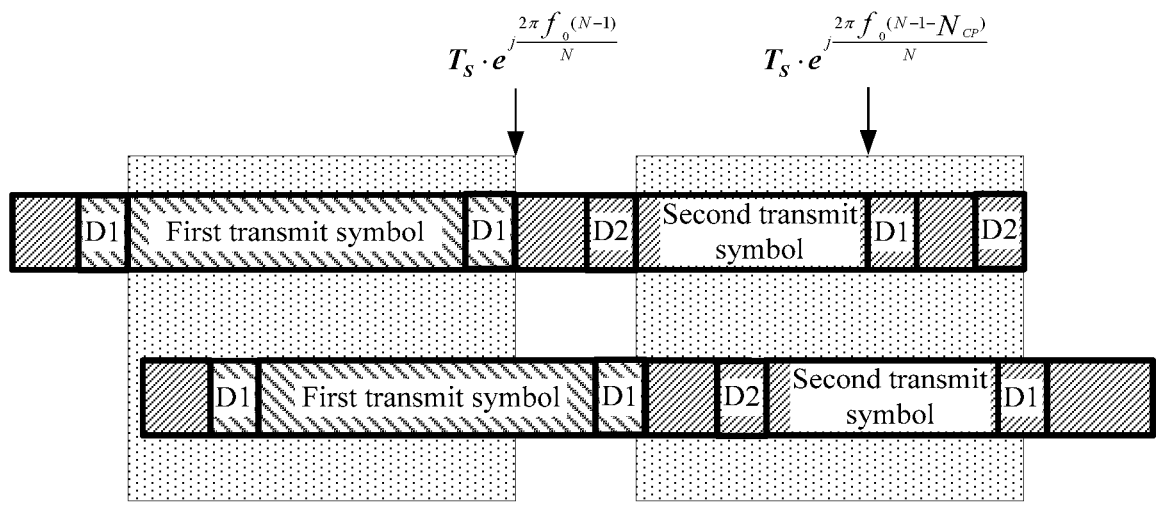
FIG. 10 is a schematic diagram of a symbol phase in non-zero frequency transmission.

As shown in FIG. 10, assuming that non-zero frequency transmission is used, as described above, the time domain signal is multiplied by the phase $$e^{j\frac{2\pi f_0 n}{N}}.$$

In this case, a phase of a symbol component D1 in the first transmit symbol may be $$T_s \cdot e^{j\frac{2\pi f_0(N-1)}{N}};$$

and a phase of a symbol component D2 in the second transmit symbol may be $$T_s \cdot e^{j\frac{2\pi f_0(N-1-N_{CP})}{N}}.$$

Because the phases between the symbols are discontinuous, the solution to flexibly configuring the inter-symbol guard period in step S340 is invalid.

To make the symbol component D1 in the first transmit symbol the same as the symbol component D2 in the second transmit symbol, that is, make the symbol component D1 in the first transmit symbol the same as the symbol component D2 in the second transmit symbol even if non-zero frequency transmission is used, ensure extension of the CP, and achieve a cyclic convolution effect, in this application, it is proposed that the phase adjustment should be performed on the first transmit symbol and/or the second transmit symbol based on a phase symbol deflection value, to ensure that the symbol component D1 in the first transmit symbol is the same as the symbol component D2 in the second transmit symbol. Correspondingly, for a receive end, a phase adjustment is performed on the first transmit symbol and/or the second transmit symbol to correctly restore data information. The following mainly describes the case of the transmit end. The case of the receive end is similar, and is not described herein.

It should be understood that a phase symbol deflection value, or a symbol phase deflection, or a symbol phase deflection value, or a phase compensation factor, is merely a name, and does not limit the protection scope of this embodiment of this application. The phase symbol deflection value may represent a deflection between phases of transmit symbols. Using FIG. 10 as an example, the phase symbol deflection value may represent a phase difference between $$T_s \cdot e^{j\frac{2\pi f_0(N-1)}{N}} \text{ and } T_s \cdot e^{j\frac{2\pi f_0(N-1-N_{CP})}{N}}.$$

Optionally, the phase adjustment may be performed on the first transmit symbol and/or the second transmit symbol based on one or more of the following information: an IFFT size, a CP length, a frequency resource position, a subcarrier center position, a subcarrier spacing, a sampling interval, a transmit symbol period, and a transmit symbol index.

In other words, the specific phase adjustment of the first transmit symbol and/or the second transmit symbol may be determined based on one or more of the foregoing information.

Optionally, the specific phase adjustment may be performed on the first transmit symbol and/or the second transmit symbol based on a phase difference between the first transmit symbol and the second transmit symbol.

In this embodiment of this application, by considering a phase difference between two adjacent transmit symbols, a phase adjustment is performed on the two transmit symbols or either of the two transmit symbols, so that symbol components shared by the two transmit symbols are the same. For example, the symbol component D1 in the first transmit symbol and the symbol component D2 in the second transmit symbol are the same.

Optionally, the phase difference between the first transmit symbol and the second transmit symbol satisfies either of the following formulas:

$$e^{\left(j\frac{2\pi f_0 \Delta f T_{CP,l}}{N}\right)} \text{ or } e^{\left(j\frac{2\pi f_0 \Delta f N_{CP,l}}{N}\right)},$$

where $f_0$ represents the subcarrier center position, $\Delta f$ represents the subcarrier spacing, $T_{CP,l}$ represents duration of a CP of an $l^{th}$ transmit symbol, $N_{cp,l}$ represents a quantity of sampling points of the CP of the $l^{th}$ transmit symbol, for example, may be 144, l represents the transmit symbol index, l=0, 1, 2, . . . , j represents a complex-valued symbol, that is, $j=\sqrt{-1}$, and N represents the IFFT size. For meanings of the foregoing parameters, refer to specific meanings in an existing protocol.

For example, a phase difference may be predefined in the protocol. When non-zero frequency transmission is used, a phase adjustment or phase compensation may be performed based on the predefined phase difference on the transmit symbols after signal processing, so that the phase of the symbol component D1 in the first transmit symbol and the phase of the symbol component D2 in the second transmit symbol are continuous, or that the symbol component D1 in the first transmit symbol and the symbol component D2 in the second transmit symbol are the same.

It should be understood that the formulas satisfied by the phase difference illustrated above are only two possible forms, and any variation that belongs to either of the foregoing formulas shall fall within the protection scope of this embodiment of this application.

It should be further understood that the phase difference represents a phase difference between the first transmit symbol and the second transmit symbol before the phase adjustment.

It should be further understood that by considering the phase difference between the two adjacent transmit symbols, the phase adjustment is performed on the two transmit symbols or either of the two transmit symbols, and that any phase adjustment shall fall within the protection scope of this embodiment of this application so long as the phase adjustment can cause the symbol components shared by the two transmit symbols to be the same.

The following illustrates several possible solutions.

Optionally, the phase adjustment may be performed on the first transmit symbol and/or the second transmit symbol according to any one of the following solutions.

Solution 1: Dividing the first transmit symbol by a phase compensation factor.

It may be understood that, after the transmit symbol is generated in step S360, the phase adjustment is performed on the transmit symbol based on the phase compensation factor. For example, the transmit symbol is divided by the phase compensation factor. Finally, the transmit symbol after the phase adjustment is output.

Optionally, the phase compensation factor may be expressed as any one of the following:

$$e^{j2\pi f_0 \Delta f T_{CP,l}\left\lceil\frac{t}{(N+N_{CP,l})T_c}\right\rceil}, e^{\left(j\frac{2\pi f_0 \Delta f T_{CP,l}}{N}\right)}, \text{ or } e^{\left(j\frac{2\pi f_0 \Delta f T_{CP,l}}{N}\right)},$$

where t represents a time variable, for example, represents a time variable for generating a signal whose duration is one subframe, $T_c$ represents a sampling interval, and $\lceil \ \rceil$ represents round-up. It should be understood that rounding may alternatively be round-down or round-off or the like, and is not limited. The following mainly uses round-up as an example for description.

For example, using FIG. 10 as an example, the first transmit symbol is divided by the phase compensation factor. In this case, the phase of the symbol component D1 in the first transmit symbol may be adjusted to $$T_s \cdot e^{j\frac{2\pi f_0(N-1-N_{CP})}{N}}$$

and therefore is the same as the phase of the symbol component D2 in the second transmit symbol, so that the phases of the symbols are continuous, that is, the symbol component D1 in the first transmit symbol is the same as the symbol component D2 in the second transmit symbol.

Before the phase adjustment, the phase of the symbol component D1 in the first transmit symbol is $$T_s \cdot e^{j\frac{2\pi f_0(N-1)}{N}},$$

and a phase adjustment process for adjusting the phase $$T_s \cdot e^{j\frac{2\pi f_0(N-1)}{N}}$$

of the symbol component D1 in the first transmit symbol may be any one of the following:

$$T_s \cdot \left(e^{j\frac{2\pi f_0(N-1)}{N}} / e^{2\pi f_0 \Delta f T_{CP,l}}\right) = T_s \cdot \left(e^{j\frac{2\pi f_0(N-1)}{N}} / e^{j\frac{2\pi f_0 N_{CP}}{N}}\right) =$$

$$T_s \cdot \left(e^{j\frac{2\pi f_0(N-1)}{N}} / \frac{e^{-j\frac{2\pi f_0(N-1-N_{CP})}{N}}}{e^{-j\frac{2\pi f_0(N-1)}{N}}}\right) = T_s \cdot e^{j\frac{2\pi f_0(N-1-N_{CP})}{N}};$$

alternatively, $$T_s \cdot \left(e^{j\frac{2\pi f_0(N-1)}{N}} / e^{j\frac{2\pi f_0 N_{CP}}{N}}\right) =$$

$$T_s \cdot \left(e^{j\frac{2\pi f_0(N-1)}{N}} / \frac{e^{-j\frac{2\pi f_0(N-1-N_{CP})}{N}}}{e^{-j\frac{2\pi f_0(N-1)}{N}}}\right) = T_s \cdot e^{j\frac{2\pi f_0(N-1-N_{CP})}{N}};$$

alternatively, $$T_s \cdot \left(e^{j\frac{2\pi f_0(N-1)}{N}} / e^{j2\pi f_0 \Delta f T_{CP,l}\left[\frac{t}{(N+N_{CP,l})T_c}\right]}\right) =$$

$$T_s \cdot \left(e^{j\frac{2\pi f_0(N-1)}{N}} / \frac{e^{-j\frac{2\pi f_0(N-1-N_{CP})}{N}}}{e^{-j\frac{2\pi f_0(N-1)}{N}}}\right) = T_s \cdot e^{j\frac{2\pi f_0(N-1-N_{CP})}{N}}.$$

Assuming that the phase compensation factor is expressed in a form of $$e^{j2\pi f_0 \Delta f T_{CP,l}\left\lceil\frac{t}{(N+N_{CP,l})T_c}\right\rceil},$$

every sampling point of the first transmit symbol may be divided by $$e^{j2\pi f_0 \Delta f T_{CP,l} \left[\frac{t}{(N+N_{CP,l})T_c}\right]}.$$

In this way, the phase of the symbol component D1 in the first transmit symbol can be adjusted to $$T_s \cdot e^{j\frac{2\pi f_0(N-1-N_{CP})}{N}}.$$

In this solution, the protocol may predefine the phase compensation factor, and when non-zero frequency transmission is used, the signal is compensated based on the phase compensation factor. For example, a division operation is performed on the first transmit symbol by using the phase compensation factor.

Solution 2: Multiplying the second transmit symbol by a phase compensation factor.

It may be understood that, after the transmit symbol is generated in step S360, the phase adjustment is performed on the transmit symbol based on the phase compensation factor. For example, the transmit symbol is multiplied by the phase compensation factor. Finally, the transmit symbol after the phase adjustment is output.

Optionally, the phase compensation factor may be expressed as any one of the following:

$$e^{j2\pi f_0 \Delta f T_{CP,l} \left[\frac{t}{(N+N_{CP,l})T_c}\right]}, e^{\left(j\frac{2\pi f_0 \Delta f T_{CP,l}}{N}\right)}, \text{ or } e^{\left(j\frac{2\pi f_0 \Delta f T_{CP,l}}{N}\right)}.$$

where t represents a time variable, for example, represents a time variable for generating a signal whose duration is one subframe, $T_c$ represents a sampling interval, and $\lceil \ \rceil$ represents round-up. It should be understood that rounding may alternatively be round-down or round-off or the like, and is not limited. The following mainly uses round-up as an example for description.

For example, using FIG. 10 as an example, the second transmit symbol is multiplied by the phase compensation factor. In this case, the phase of the symbol component D2 in the second transmit symbol may be adjusted to $$T_s \cdot e^{j\frac{2\pi f_0(N-1)}{N}}$$

and therefore is the same as the phase of the symbol component D1 in the first transmit symbol, so that the phases of the symbols are continuous, that is, the symbol component D1 in the first transmit symbol is the same as the symbol component D2 in the second transmit symbol.

Before the phase adjustment, the phase of the symbol component D2 in the second transmit symbol is $$T_s \cdot e^{j\frac{2\pi f_0(N-1-N_{CP})}{N}},$$

and a phase adjustment process for adjusting the phase $$T_s \cdot e^{j\frac{2\pi f_0(N-1-N_{CP})}{N}}$$

of the symbol component D2 in the second transmit symbol may be any one of the following:

$$T_s \cdot \left(e^{j\frac{2\pi f_0(N-1-N_{CP})}{N}} \cdot e^{j2\pi f_0 \Delta f T_{CP,l}}\right) = T_s \cdot \left(e^{j\frac{2\pi f_0(N-1-N_{CP})}{N}} \cdot e^{j\frac{2\pi f_0 N_{CP}}{N}}\right) =$$

$$T_s \cdot \left(e^{j\frac{2\pi f_0(N-1-N_{CP})}{N}} \cdot \frac{e^{-j\frac{2\pi f_0(N-1-N_{CP})}{N}}}{e^{-j\frac{2\pi f_0(N-1)}{N}}}\right) = T_s \cdot e^{j\frac{2\pi f_0(N-1)}{N}};$$

alternatively, $$T_s \cdot \left(e^{j\frac{2\pi f_0(N-1-N_{CP})}{N}} \cdot e^{j\frac{2\pi f_0 N_{CP}}{N}}\right) =$$

$$T_s \cdot \left(e^{j\frac{2\pi f_0(N-1-N_{CP})}{N}} \cdot \frac{e^{-j\frac{2\pi f_0(N-1-N_{CP})}{N}}}{e^{-j\frac{2\pi f_0(N-1)}{N}}}\right) = T_s \cdot e^{j\frac{2\pi f_0(N-1)}{N}};$$

alternatively, $$T_s \cdot \left(e^{j\frac{2\pi f_0(N-1-N_{CP})}{N}} \cdot e^{j2\pi f_0 \Delta f T_{CP,l} \left[\frac{t}{(N+N_{CP,l})T_c}\right]}\right) =$$

$$T_s \cdot \left(e^{j\frac{2\pi f_0(N-1-N_{CP})}{N}} \cdot \frac{e^{-j\frac{2\pi f_0(N-1-N_{CP})}{N}}}{e^{-j\frac{2\pi f_0(N-1)}{N}}}\right) = T_s \cdot e^{j\frac{2\pi f_0(N-1)}{N}}.$$

For example, assuming that the phase compensation factor is expressed in a form of $$e^{j2\pi f_0 \Delta f T_{CP,l} \left[\frac{t}{(N+N_{CP,l})T_c}\right]},$$

every sampling point of the second transmit symbol may be multiplied by $$e^{j2\pi f_0 \Delta f T_{CP,l} \left[\frac{t}{(N+N_{CP,l})T_c}\right]}.$$

In this way, the phase of the symbol component D2 in the second transmit symbol can be adjusted to $$T_s \cdot e^{j\frac{2\pi f_0(N-1)}{N}}.$$

In this solution, the protocol may predefine the phase compensation factor, and when non-zero frequency transmission is used, the signal is compensated based on the phase compensation factor. For example, a multiplication operation is performed on the second transmit symbol by using the phase compensation factor.

Solution 3: Multiplying the first transmit symbol by a first phase factor, and multiplying the second transmit symbol by a second phase factor.

Optionally, a difference between the first phase factor and the second phase factor may be the phase difference between the first transmit symbol and the second transmit symbol, for example, $$e^{\left(j\frac{2\pi f_0 \Delta fT_{CP,l}}{N}\right)} \text{ or } e^{\left(j\frac{2\pi f_0 \Delta fN_{CP,l}}{N}\right)}.$$

It may be understood that, after the transmit symbol is generated in step S360, the phase adjustment is performed on the transmit symbol based on the first phase factor and/or the second phase factor. Finally, the transmit symbol after the phase adjustment is output.

For example, using FIG. 10 as an example, the first transmit symbol is multiplied by the first phase factor, the second transmit symbol is multiplied by the second phase factor, or the second transmit symbol is multiplied by the phase compensation factor. In this case, the phase of the symbol component D1 in the first transmit symbol and the phase of the symbol component D2 in the second transmit symbol may be adjusted to be the same, for example, both adjusted to $$T_s \cdot e^{j\frac{2\pi f_0(N-1)}{N}} \text{ or } T_s \cdot e^{j\frac{2\pi f_0(N-1)-N_{CP}}{N}},$$

so that the phases of the symbols are continuous, that is, the symbol component D1 in the first transmit symbol is the same as the symbol component D2 in the second transmit symbol.

In this solution, the protocol may predefine the first phase factor and the second phase factor. Alternatively, the first phase factor and the phase compensation factor may be predefined, so that the second phase factor can be calculated. Alternatively, the second phase factor and the phase compensation factor may be predefined, so that the first phase factor can be calculated. When non-zero frequency transmission is used, the adjacent signals are respectively compensated based on the first phase factor and the second phase factor. For example, a multiplication operation is performed on the first transmit symbol by using the first phase factor, and a multiplication operation is performed on the second transmit symbol by using the second phase factor.

It should be understood that the three solutions illustrated above are merely examples for description, and this embodiment of this application is not limited thereto. Any phase adjustment shall fall within the protection scope of this embodiment of this application so long as the phase adjustment can cause the phase of the symbol component D1 in the first transmit symbol and the phase of the symbol component D2 in the second transmit symbol to be continuous or cause the symbol component D1 in the first transmit symbol and the symbol component D2 in the second transmit symbol to be the same. For example, alternatively, a division operation may be performed on the first transmit symbol by using one phase factor, and a division operation may be performed on the second transmit symbol by using another phase factor. For another example, alternatively, a multiplication operation may be performed on the first transmit symbol by using one phase factor, and a division operation may be performed on the second transmit symbol by using another phase factor.

The foregoing uses the transmit end as an example for description. It should be understood that the receive end also performs the compensation or phase adjustment on the entire transmit symbol by using the phase factor, to correctly restore the data information. For example, by using a frequency position at which data needs to be copied, the terminal device may perform subcarrier-level phase compensation on frequency information of the data. The phase compensation is jointly determined by a frequency resource position, a CP length, or a symbol index value. For details, refer to the foregoing description of the phase compensation factor. Details are not described herein again.

The transmit symbol in this embodiment of this application may be a single-carrier waveform symbol. For example, the transmit symbol is a DFT-s-OFDM symbol. The DFT-s-OFDM symbol represents a single-carrier symbol whose waveform is a DFT-s-OFDM waveform. For another example, the transmit symbol is an SC-QAM symbol. The SC-QAM symbol represents a single-carrier symbol whose waveform is an SC-QAM waveform.

In the following specification, a scenario in which this application is applicable to a wireless communications system using a DFT-s-OFDM waveform is denoted as an application scenario 1, and a scenario in which this application is applicable to a wireless communications system using an SC-QAM waveform is denoted as an application scenario 2.

Figure 11:
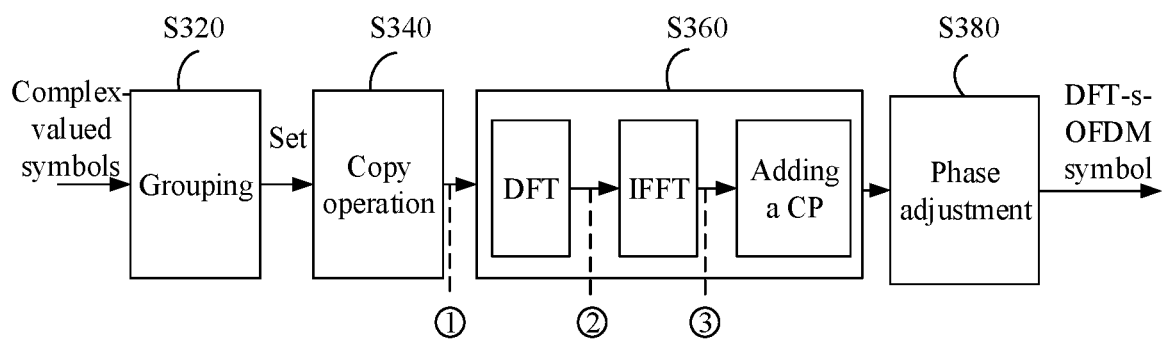
FIG. 11 and FIG. 12 are basic flowcharts of symbol processing methods according to an embodiment of this application.

Optionally, an application scenario of this application is the application scenario 1, to be specific, the transmit symbol is a DFT-s-OFDM symbol. As shown in FIG. 11, step S360 includes not only an operation of adding a CP, but also DFT and IFFT operations.

For example, in step S360, the transmitter performs M-point DFT transform on the set obtained after the copying operation; maps M-point frequency domain elements obtained after the DFT transform to M consecutive subcarriers (not shown in FIG. 11); performs IFFT transform on a frequency domain signal after subcarrier mapping; and adds the CP to the signal obtained after the IFFT, to finally obtain the DFT-s-OFDM symbol. The DFT may also be referred to as frequency domain precoding.

Optionally, step S360 further includes a frequency domain spectrum shaping (FDSS) operation.

For example, in step S360, the transmitter performs M-point DFT transform on the set obtained after the copying operation; performs cyclic extension and frequency-domain filtering (namely, the FDSS operation) on M-point frequency domain elements obtained after the DFT transform; maps frequency domain elements obtained after the FDSS operation to M1 (M1≥M) consecutive subcarriers; performs IFFT transform on a frequency domain signal after subcarrier mapping; and adds the CP to the signal obtained after the IFFT, to finally obtain the DFT-s-OFDM symbol.

It should be understood that, in the application scenario 1, the copy operation is performed on the set before the DFT is performed.

Figure 12:
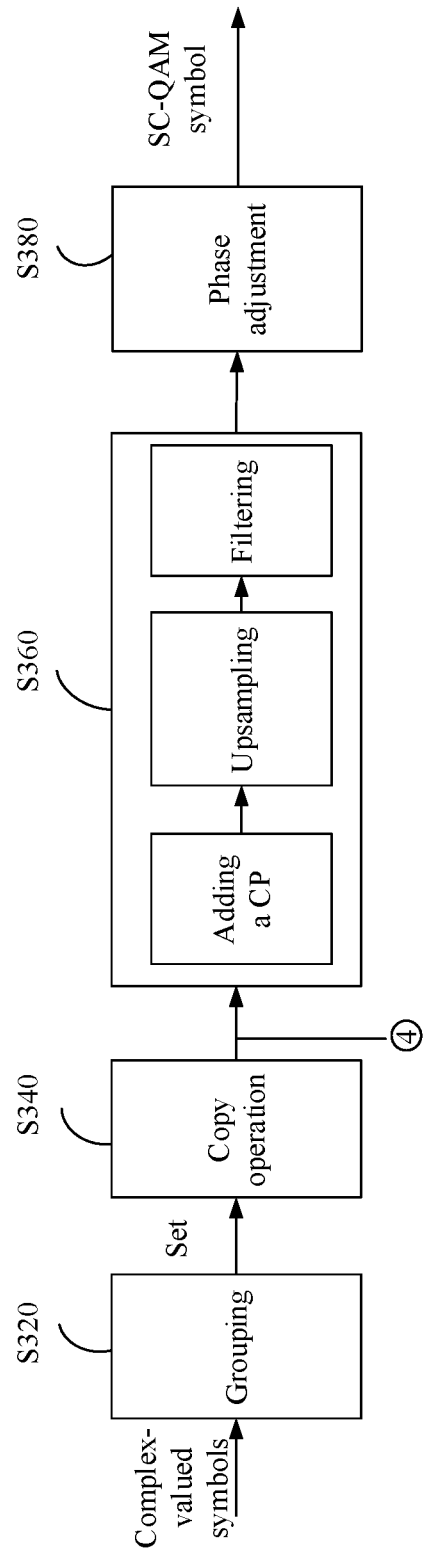

Optionally, an application scenario of this application is the application scenario 2, to be specific, the transmit symbol is an SC-QAM symbol. As shown in FIG. 12, step S360 not only includes an operation of adding a CP, but also includes upsampling and filtering.

For example, in step S360, the transmitter adds the CP to a set obtained after the copying operation, to obtain a signal obtained after the CP is added, and then performs upsampling and filtering on the signal obtained after the CP is added, to finally obtain the SC-QAM symbol.

It should be understood that, in the application scenario 2, the copy operation is performed on the set before the CP is added.

Therefore, in this embodiment of this application, the copy operation is performed on the two sets corresponding to the two transmit symbols continuous in time domain, so that the two sets have the same complex-valued symbols. This helps generate transmit symbols having the time domain structures shown in FIG. 3. Therefore, given a fixed CP length, an inter-symbol guard period can be flexibly configured. In addition, performing the phase adjustment on the transmit symbol can ensure that the inter-symbol guard period is flexibly configured.

For ease of understanding and description of the copy operation on the set, the following first describes an association relationship between the set and the transmit symbol.

For ease of description rather than limitation, three reference points are defined for the transmit symbol: the first reference point, the second reference point, and the third reference point, as shown in FIG. 3. The first reference point represents the end position of the transmit symbol, the second reference point represents the position of the truncated CP in the transmit symbol, and the third reference point represents the start position of the transmit symbol. The length of the distance between the second reference point and the end position of the transmit symbol is equal to the CP length.

The following separately uses the application scenario 1 and the application scenario 2 as examples for description.

(1) Application scenario 1: The transmit symbol is a DFT-s-OFDM symbol. In the application scenario 1, a symbol processing procedure is shown in FIG. 11.

Assuming (denoted as an assumption 1) that a quantity of points of DFT performed by the transmit end is M, a dimension of a time domain vector on which the DFT transform is to be performed should be M. The time domain vector may be denoted as:

$$x_I = [x_I(0), x_I(1), \ldots, x_I(M-1)]^T,$$

where $x_I$ represents the time domain vector.

The time domain vector $x_I$ includes M elements, and time domain indexes of the first element to the last element are respectively 0, 1, ..., M−1.

Assuming (denoted as an assumption 2) that a quantity of points of DFT performed by the transmit end is M (consistent with the assumption 1), and that a size of IFFT performed by the transmit end is N, and that a quantity of sampling points of the CP is Q, a quantity of points to which the length occupied by the CP can be equivalent before the DFT is K=Q/N·M.

If Q cannot be exactly divided by N, a calculation result of K is a non-integer. In this case, the calculation result of K needs to be rounded to an integer, that is, K=⌊(Q/N)·M⌋, where ⌊(Q/N)·M⌋ indicates that (Q/N)·M is rounded down to an integer. It should be noted that the rounding manner herein may alternatively be round-up, round-off, or the like.

It should be understood that the quantity Q of the sampling points of the CP may be obtained based on the CP length.

Based on the foregoing assumption, for a first reference point of the DFT-s-OFDM symbol, a time domain index of the first reference point in the time domain vector $x_I$ is M−1; for a second reference point of the DFT-s-OFDM symbol, a time domain index of the second reference point in the time domain vector $x_I$ is M−K−1; and for a third reference point of the DFT-s-OFDM symbol, a time domain index of the third reference point in the time domain vector $x_1$ is 0.

It should be understood that the correspondence may indicate positions of main components of each complex-valued symbol in the DFT-s-OFDM symbol after the DFT-s-OFDM symbol is generated in the complex-valued symbol set.

(2) Application scenario 2: The transmit symbol is an SC-QAM symbol. As shown in FIG. 12, in a process of generating the SC-QAM symbol, DFT and IFFT are not included before the CP is added, and upsampling and filtering are performed after the CP is added. Therefore, a quantity of points equivalent to a CP length in the time domain vector can be directly obtained based on the CP length. Therefore, the transmitter can directly obtain the equivalent CP length value K1. The equivalent CP length value K1 may be obtained based on the CP length.

Assuming that a time domain vector to which no CP is added is the M-dimensional time domain vector $x_I$ described in the application scenario 1, and assuming that an equivalent CP length value is K1, for a first reference point of the SC-QAM symbol, a time domain index of the first reference point in the time domain vector $x_1$ is M−1; for a second reference point of the SC-QAM symbol, a time domain index of the second reference point in the time domain vector $x_I$ is M−K1−1; and for a third reference point of the SC-QAM symbol, a time domain index of the third reference point in the time domain vector $x_I$ is 0.

It is described above that the set may be viewed as a multi-dimensional time domain vector. The time domain vector $x_I$ in the foregoing example may represent a time domain vector corresponding to the set. Elements in the time domain vector $x_I$ correspond to complex-valued symbols in the set. Time domain indexes of the elements in the time domain vector $x_I$ correspond to positions of the complex-valued symbols of the set in the set.

The foregoing example shows that a correspondence exists between the time domain indexes of the elements in the time domain vector $x_I$ and the time domain positions (for example, the first reference point, the second reference point, and the third reference point) in the transmit symbol corresponding to the time domain vector $x_I$. Therefore, it may be understood that a correspondence also exists between the positions of the complex-valued symbols in the set and the positions in the transmit symbol corresponding to the set.

Figure 13:
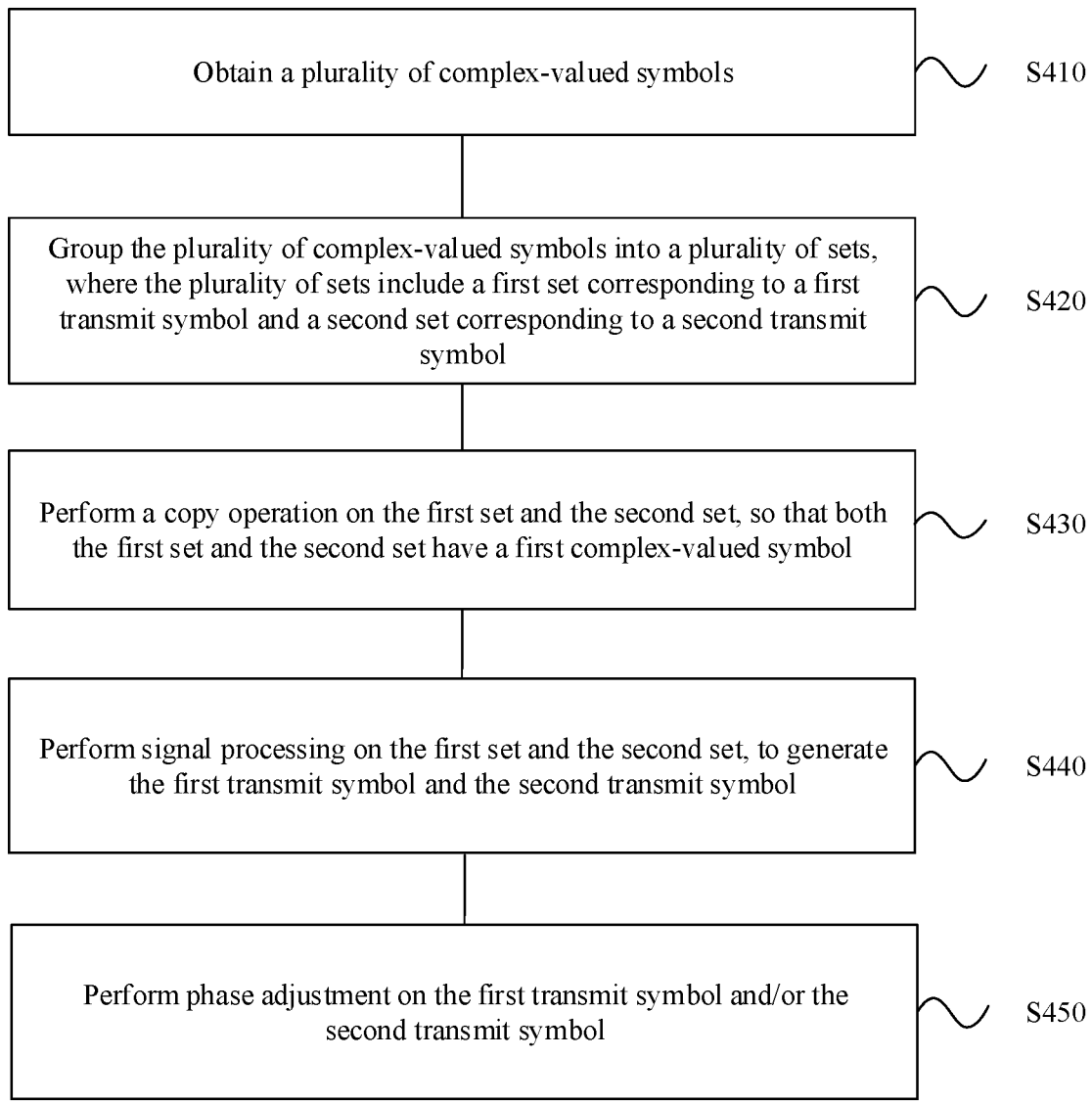
FIG. 13 is a schematic flowchart of a symbol processing method according to an embodiment of this application.

FIG. 13 is a schematic flowchart of a symbol processing method according to another embodiment of this application. The method includes the following step S410 to step S450.

S410: Obtain a plurality of complex-valued symbols.

The plurality of complex-valued symbols may include a modulated symbol obtained by modulating an encoded bit stream.

Optionally, the plurality of complex-valued symbols may further include a reference signal sampling point. For example, the reference signal sampling point may include a PTRS sampling point.

S420: Group the plurality of complex-valued symbols into a plurality of sets.

Each set may include several complex-valued symbols. For example, each set may be considered as a multidimensional time domain vector, and a complex-valued symbol in the set may be considered as an element in the time domain vector.

Each set corresponds to one transmit symbol. For example, each set corresponds to a DFT-s-OFDM symbol or an SC-QAM symbol.

The plurality of sets include a first set corresponding to a first transmit symbol and a second set corresponding to a second transmit symbol. The first transmit symbol and the second transmit symbol are continuous in time domain. The first transmit symbol is located before the second transmit symbol.

Step S420 may correspond to step S320 shown in FIG. 9, FIG. 11, or FIG. 12.

S430: Perform a copy operation on the first set and the second set, so that both the first set and the second set have a first complex-valued symbol, where the first complex-valued symbol may include a plurality of complex-valued symbols.

In this specification, a subset formed by the first complex-valued symbol in the first set is referred to as a first subset, and a subset formed by the first complex-valued symbol in the second set is referred to as a second subset.

In step S430, the copy operation causes the first set to include the first subset and the second set to include the second subset. Complex-valued symbols included in the first subset and the second subset are the same. A time domain position of the first subset and a time domain position of the second subset may be the same or different.

Optionally, in some embodiments, the time domain position of the first subset and the time domain position of the second subset may be the same. To be specific, a time domain index of a start position of the first subset is the same as a time domain index of a start position of the second subset, and a time domain index of an end position of the first subset is the same as a time domain index of an end position of the second subset.

In this specification, the copy operation in step S430 in this embodiment is referred to as an intra-position copy operation.

The copy operation in step S430 mentioned hereinafter is an intra-position copy operation. It means that the copy operation in step S430 causes both the first set and the second set to have the first complex-valued symbol. In addition, the time domain position of the first subset formed by the first complex-valued symbol in the first set is the same as the time domain position of the second subset formed by the first complex-valued symbol in the second set.

Optionally, in a possible implementation, the first subset and the second subset have a same length, but do not have a same index. For example, the time domain position of the first subset is different from the time domain position of the second subset. In this case, a transmitter may perform processing such as a cyclic shift or frequency domain weighting in a subsequent processing step to adjust the first subset and the second subset to a same time domain position, and this is equivalent to intra-position copy.

It should be noted that the copy operation performed on the first set and the second set in step S430 may also be understood as mapping the first complex-valued symbol to the first set and the second set.

Step S430 may correspond to step S340 shown in FIG. 9, FIG. 11, or FIG. 12.

It should be understood that, in an application scenario 1, step S430 is performed before DFT, and in an application scenario 2, step S430 is performed before a CP is added.

The copy operation in step S430 may be forward copy, or may be backward copy.

Optionally, in the embodiment shown in FIG. 13, step S430 includes: copying the first complex-valued symbol in the first set to the second set. This copy mode may be referred to as backward copy.

Optionally, in the embodiment shown in FIG. 13, step S430 includes: copying the first complex-valued symbol in the second set to the first set. This copy mode may be referred to as forward copy.

S440: Perform signal processing on the first set and the second set after the copy operation, to generate the first transmit symbol and the second transmit symbol.

The signal processing includes a cyclic shift or frequency domain weighting, as described in detail below.

It should be understood that if the signal processing in step S440 is the cyclic shift, the signal processing is performed on a time domain signal corresponding to the first set and a time domain signal corresponding to the second set in step S440; or if the signal processing in step S440 is the frequency domain weighting, the frequency domain weighting is performed on a frequency domain signal corresponding to the first set and a frequency domain signal corresponding to the second set in step S440.

S450: Perform phase adjustment on the first transmit symbol and/or the second transmit symbol.

Because the phase adjustment is performed on the first transmit symbol and/or the second transmit symbol, the symbol component of the first transmit symbol at a first reference point and the symbol component of the second transmit symbol at a second reference point are continuous. In other words, because the phase adjustment is performed on the first transmit symbol and/or the second transmit symbol, a symbol component whose end position is the first reference point in the first transmit symbol is the same as a symbol component whose end position is the second reference point in the second transmit symbol.

Step S450 may correspond to step S380 shown in FIG. 9, FIG. 11, or FIG. 12.

The signal processing mentioned in step S440 is described in detail below.

Step S440 includes a plurality of implementations.

Optionally, in a first implementation, the signal processing in step S440 includes first signal processing, and the first signal processing includes the cyclic shift or the frequency domain weighting.

In the first implementation, step S440 includes: separately performing the first signal processing on the first set and the second set after the copy operation, where the first signal processing causes the end position of the first subset to correspond to the first reference point of the first transmit symbol and causes the end position of the second subset to correspond to the second reference point of the second transmit symbol. The first reference point represents the end position of the transmit symbol, and the second reference point represents a position of a truncated CP of the transmit symbol.

In this embodiment, because the copy operation is performed on the first set and the second set corresponding to the first transmit symbol and the second transmit symbol continuous in time domain, both the first set and the second set have the first complex-valued symbol; and because the first signal processing is performed on the first set and the second set, the end position of the first subset formed by the first complex-valued symbol in the first set corresponds to the first reference point of the first transmit symbol, and the end position of the second subset in the second set corresponds to the second reference point of the second transmit symbol. In this way, the first transmit symbol and the second transmit symbol having the time domain structures shown in FIG. 3 can be generated. Therefore, in this embodiment of this application, given a fixed CP length, an inter-symbol guard period can be flexibly configured. In addition, performing the phase adjustment on the first transmit symbol and/or the second transmit symbol can ensure that the inter-symbol guard period is flexibly configured.

Optionally, in a second implementation, the signal processing in step S440 includes first signal processing and second signal processing, the first signal processing includes the cyclic shift or the frequency domain weighting, and the second signal processing includes the cyclic shift or the frequency domain weighting. If the first signal processing is the cyclic shift, the second signal processing is the cyclic shift. If the first signal processing is the frequency domain weighting, the second signal processing may be the frequency domain weighting or the cyclic shift.

In the second implementation, step S440 includes: separately performing the first signal processing on the first set and the second set after the copy operation, where the first signal processing causes the end position of the first subset to correspond to the first reference point of the first transmit symbol and causes the end position of the second subset to correspond to the second reference point of the second transmit symbol; and simultaneously performing the second signal processing on a signal of the first set after the first signal processing and a signal of the second set after the first signal processing, where the second signal processing causes the start position of the first subset to correspond to a position before the first reference point of the first transmit symbol and the end position of the first subset to correspond to a position after the first reference point of the first transmit symbol, and causes the start position of the second subset to correspond to a position before the second reference point of the second transmit symbol and the end position of the second subset to correspond to a position after the second reference point of the second transmit symbol, where the first reference point represents the end position of the transmit symbol, and the second reference point represents a position of a truncated CP of the transmit symbol.

In the second implementation, the second signal processing may be understood as a common shift operation on the first set and the second set.

In this embodiment of this application, because the copy operation is performed on the first set and the second set corresponding to the first transmit symbol and the second transmit symbol continuous in time domain, both the first set and the second set have the first complex-valued symbol; and because the first signal processing and the second signal processing are performed on the first set and the second set, the start position and the end position of the first subset respectively correspond to the positions before and after the first reference point of the first transmit symbol, and the start position and the end position of the second subset respectively correspond to the positions before and after the second reference point of the second transmit symbol. In this way, the first transmit symbol and the second transmit symbol having the time domain structures shown in FIG. 3 can be generated. Therefore, in this embodiment of this application, given a fixed CP length, an inter-symbol guard period can be flexibly configured. In addition, performing the phase adjustment on the first transmit symbol and/or the second transmit symbol can ensure that the inter-symbol guard period is flexibly configured.

In addition, it should be understood that, because the first signal processing and the second signal processing are performed on the first set and the second set, the start position and the end position of the first subset respectively correspond to the positions before and after the first reference point of the first transmit symbol, and the start position and the end position of the second subset respectively correspond to the positions before and after the second reference point of the second transmit symbol, and this can reduce adverse impact of a filter smearing effect on extension of the inter-symbol guard period to some extent.

It should be noted that "the start position of the first subset corresponds to the position before the first reference point of the first transmit symbol, and the end position of the first subset corresponds to the position after the first reference point of the first transmit symbol" mentioned in this specification means that the start position of the first subset in the first set corresponds to a tail position of the first transmit symbol, and that the end position of the first subset corresponds to a header position of the first transmit symbol.

Figure 16:
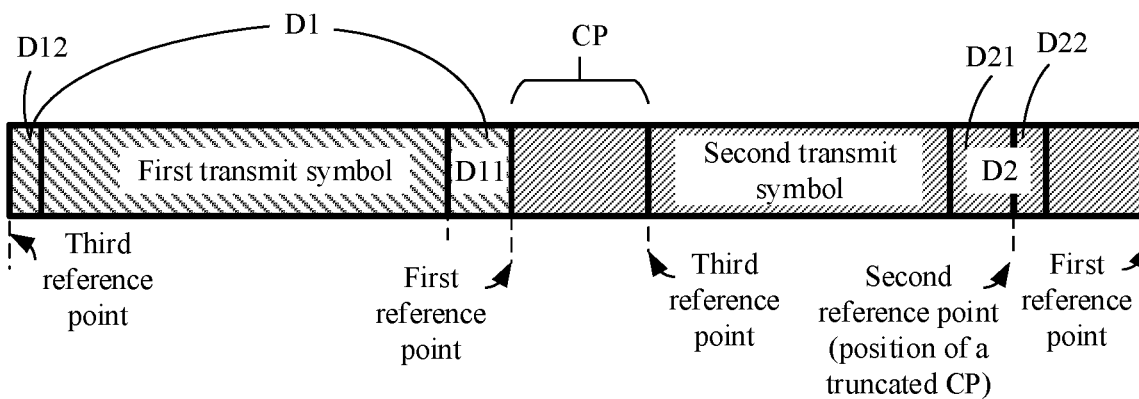
FIG. 16 is a schematic diagram of time domain structures of transmit symbols according to an embodiment of this application.

A prerequisite for "the start position of the first subset corresponds to the position before the first reference point of the first transmit symbol, and the end position of the first subset corresponds to the position after the first reference point of the first transmit symbol" mentioned in this specification is that the signal processing is performed on the first set, that is, the cyclic shift or the frequency domain weighting is performed on the first set. It should be understood that, under the prerequisite of the cyclic shift (or the frequency domain weighting), "the end position of the first subset corresponds to the position after the first reference point of the first transmit symbol" may be understood as "the end position of the first subset corresponds to the header position of the first transmit symbol" or "the end position of the first subset corresponds to a position after a third reference point of the first transmit symbol, where the third reference point represents the start position of the transmit symbol". Alternatively, from a time domain structure of the first transmit symbol, "the end position of the first subset corresponds to the position after the first reference point of the first transmit symbol" may be expressed as "the end position of the first subset corresponds to the position before the first reference point of the first transmit symbol," as shown in FIG. 16.

It should be further noted that the first reference point of the first transmit symbol (that is, the end position of the first transmit symbol) is covered in this specification to describe a case in which the time domain position of the first subset corresponds to a time domain position of the first transmit symbol. Therefore, the following description manner is used: "The start position of the first subset corresponds to the position before the first reference point of the first transmit symbol, and the end position of the first subset corresponds to the position after the first reference point of the first transmit symbol."

Optionally, in a third implementation, the signal processing in step S440 includes third signal processing, and the third signal processing includes the cyclic shift or the frequency domain weighting.

In the third implementation, step S440 includes: separately performing the third signal processing on the first set and the second set after the copy operation, where the third signal processing causes the start position of the first subset to correspond to a position before the first reference point of the first transmit symbol and the end position of the first subset to correspond to a position after the first reference point of the first transmit symbol, and causes the start position of the second subset to correspond to a position before the second reference point of the second transmit symbol and the end position of the second subset to correspond to a position after the second reference point of the second transmit symbol, where the first reference point represents the end position of the transmit symbol, and the second reference point represents a position of a truncated CP of the transmit symbol.

It should be understood that the third implementation may be considered as a result of combining the first signal processing and the second signal processing in the second implementation into one-time signal processing, where both the first signal processing and the second signal processing are the cyclic shift, or both the first signal processing and the second signal processing are the frequency domain weighting.

In this embodiment of this application, because the copy operation is performed on the first set and the second set corresponding to the first transmit symbol and the second transmit symbol continuous in time domain, both the first set and the second set have the first complex-valued symbol; and because the third signal processing is performed on the first set and the second set, the start position and the end position of the first subset respectively correspond to the positions before and after the first reference point of the first transmit symbol, and the start position and the end position of the second subset respectively correspond to the positions before and after the second reference point of the second transmit symbol. In this way, the first transmit symbol and the second transmit symbol having the time domain structures shown in FIG. 3 can be generated. Therefore, in this embodiment of this application, given a fixed CP length, an inter-symbol guard period can be flexibly configured. In addition, performing the phase adjustment on the first transmit symbol and/or the second transmit symbol can ensure that the inter-symbol guard period is flexibly configured.

In addition, it should be understood that, because the third signal processing is performed on the first set and the second set, the start position and the end position of the first subset respectively correspond to the positions before and after the first reference point of the first transmit symbol, and the start position and the end position of the second subset respectively correspond to the positions before and after the second reference point of the second transmit symbol, and this can reduce adverse impact of a filter smearing effect on extension of the inter-symbol guard period to some extent.

Figure 14:
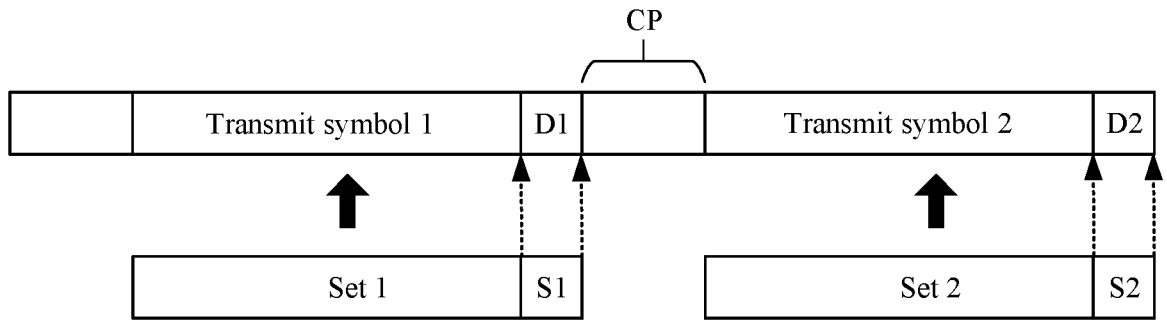
FIG. 14 is a schematic diagram of a correspondence between a set and a transmit symbol when no cyclic shift is performed according to an embodiment of this application.
Figure 15:
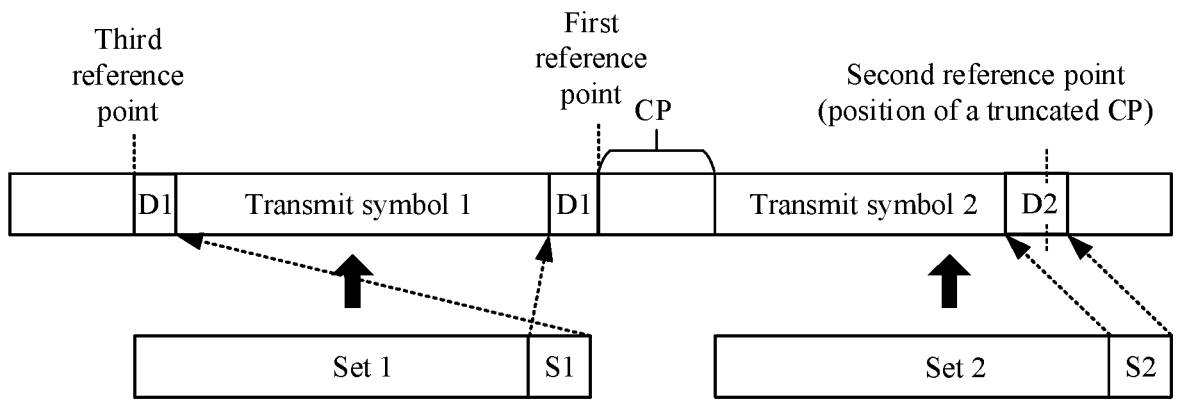
FIG. 15 is a schematic diagram of a correspondence between a set and a transmit symbol when a cyclic shift is performed according to an embodiment of this application.

For example rather than limitation, the following uses FIG. 14 and FIG. 15 for illustrative description. In FIG. 14 and FIG. 15, a set 1 corresponds to a transmit symbol 1, and a set 2 corresponds to a transmit symbol 2.

FIG. 14 shows a correspondence between a set and a transmit symbol when step S440 is not performed.

In FIG. 14, the set 1 and the set 2 are sets on which a copy operation (that is, step S430 in this embodiment of this application) is performed. Both the set 1 and the set 2 include a first complex-valued symbol, and the first complex-valued symbol may include a plurality of complex-valued symbols. A subset formed by the first complex-valued symbol in the set 1 is a subset S1 shown in FIG. 14, and a subset formed by the first complex-valued symbol in the set 2 is a subset S2 shown in FIG. 14. Time domain positions of the subset S1 and the subset S2 are the same. To be specific, start positions of the subset S1 and the subset S2 are the same, and end positions of the subset S1 and the subset S2 are also the same.

In FIG. 14, the transmit symbol 1 represents a transmit symbol generated based on the set 1 when step S440 is not performed, and the transmit symbol 2 represents a transmit symbol generated based on the set 2 when step S440 is not performed. A symbol component D1 in the transmit symbol 1 is the same as a symbol component D2 in the transmit symbol 2, and time domain positions of the symbol component D1 and the symbol component D2 are the same. The subset S1 in the set 1 corresponds to the symbol component D1 in the transmit symbol 1, and the subset S2 in the set 2 corresponds to the symbol component D2 in the transmit symbol 2.

It can be learned from FIG. 14, because the transmit symbol 1 represents the transmit symbol generated based on the set 1 when step S440 is not performed, and the transmit symbol 2 represents the transmit symbol generated based on the set 2 when step S440 is not performed, a position of the symbol component D1 in the transmit symbol 1 is not shifted relative to a position of the subset S1 in the set 1, and a position of the symbol component D2 in the transmit symbol 2 is not shifted relative to a position of the subset S2 in the set 2.

FIG. 15 shows a correspondence between a set and a transmit symbol when step S440 is performed. In the example in FIG. 15, an implementation of step S440 is the foregoing second implementation or third implementation.

In FIG. 15, the set 1 and the set 2 are sets on which a copy operation (that is, step S430 in this embodiment of this application) is performed. Both the set 1 and the set 2 include a first complex-valued symbol, and the first complex-valued symbol may include a plurality of complex-valued symbols. A subset formed by the first complex-valued symbol in the set 1 is a subset S1 shown in FIG. 15, and a subset formed by the first complex-valued symbol in the set 2 is a subset S2 shown in FIG. 15. Time domain positions of the subset S1 and the subset S2 are the same. To be specific, start positions of the subset S1 and the subset S2 are the same, and end positions of the subset S1 and the subset S2 are also the same.

In FIG. 15, the transmit symbol 1 represents a transmit symbol generated based on the set 1 when step S440 is performed, and the transmit symbol 2 represents a transmit symbol generated based on the set 2 when step S440 is performed. A symbol component D1 in the transmit symbol 1 is the same as a symbol component D2 in the transmit symbol 2. A start position of the symbol component D1 is located before a first reference point of the transmit symbol 1, and an end position of the symbol component D1 is located after the first reference point of the transmit symbol 1 (that is, a header of the transmit symbol 1). In other words, the end position of the symbol component D1 is located after a third reference point of the transmit symbol 1, as shown in FIG. 15. A start position of the symbol component D2 is located before a second reference point of the transmit symbol 2, and an end position of the symbol component D2 is located after the second reference point of the transmit symbol 2. The first reference point represents the end position of the transmit symbol. The second reference point represents a position of a truncated CP of the transmit symbol, that is, a distance between the second reference point and the first reference point is equal to a length of the CP. The third reference point represents the start position of the transmit symbol. The symbol component D1 in the transmit symbol 1 corresponds to the subset S1 in the set 1, and the symbol component D2 in the transmit symbol 2 corresponds to the subset S2 in the set 2.

It can be learned from FIG. 15, because the transmit symbol 1 represents the transmit symbol generated based on the set 1 when step S440 is performed, and the transmit symbol 2 represents the transmit symbol generated based on the set 2 when step S440 is performed, a position of the symbol component D1 in the transmit symbol 1 is shifted relative to a position of the subset S1 in the set 1, and a position of the symbol component D2 in the transmit symbol 2 is shifted relative to a position of the subset S2 in the set 2.

For example, in this embodiment of this application, the first set may correspond to the set 1 in FIG. 15, the second set may correspond to the set 2 in FIG. 15, the first transmit symbol may correspond to the transmit symbol 1 in FIG. 15, and the second transmit symbol may correspond to the transmit symbol 2 in FIG. 15.

For example, step S440 includes the first signal processing and the second signal processing. In this embodiment of this application, time domain structures of the first transmit symbol corresponding to the first set and the second transmit symbol corresponding to the second set are shown in FIG. 16. In FIG. 16, the symbol component D1 in the first transmit symbol is the same as the symbol component D2 in the second transmit symbol, the start position of the symbol component D1 is located before the first reference point of the first transmit symbol, the end position of the symbol component D1 is located after the first reference point of the first transmit symbol (that is, located at the header of the first transmit symbol), the start position of the symbol component D2 is located before the second reference point of the second transmit symbol, and the end position of the symbol component D2 is located after the second reference point of the second transmit symbol.

In FIG. 16, a symbol component denoted as D11 in the symbol component D1 is located before the first reference point of the first transmit symbol, and a symbol component (that is, a symbol component located after the third reference point) denoted as D12 in the symbol component D1 is located after the first reference point of the first transmit symbol; and a symbol component denoted as D21 in the symbol component D2 is located before the second reference point of the second transmit symbol, and a symbol component denoted as D22 in the symbol component D2 is located after the second reference point of the second transmit symbol. Referring to FIG. 3 and FIG. 16, it can be learned that the symbol component D11 in the first transmit symbol shown in FIG. 16 corresponds to the symbol component D1 in the first transmit symbol shown in FIG. 3, and that the symbol component D21 in the second transmit symbol shown in FIG. 16 corresponds to the symbol component D2 in the second transmit symbol shown in FIG. 3.

In this embodiment of this application, the copy operation, the first signal processing, and the second signal processing are performed on two sets corresponding to two transmit symbols continuous in time domain. Therefore, the first transmit symbol and the second transmit symbol having the time domain structures shown in FIG. 16 can be generated. Therefore, in this embodiment of this application, given a fixed CP length, an inter-symbol guard period can be flexibly configured. In addition, performing the phase adjustment on the first transmit symbol and/or the second transmit symbol can ensure implementation of this solution, that is, ensure that the inter-symbol guard period is flexibly configured.

In addition, it should be understood that, because the first signal processing and the second signal processing are performed on the first set and the second set, the start position and the end position of the first subset respectively correspond to the positions before and after the first reference point of the first transmit symbol, and the start position and the end position of the second subset respectively correspond to the positions before and after the second reference point of the second transmit symbol, and this can reduce adverse impact of a filter smearing effect on extension of the inter-symbol guard period to some extent.

For ease of understanding and description, this application uses the first transmit symbol and the second transmit symbol continuous in time domain as an example for description. It should be understood that the symbol processing method provided in this application is applicable to any two or more transmit symbols continuous in time domain in a signal stream transmitted by a transmit end.

An execution occasion of step S440 in this embodiment of this application may vary according to different application scenarios.

In the application scenario 1, an occasion at which step S440 is performed may include ①, ②, and ③ shown in FIG. 11.

Optionally, in the embodiment shown in FIG. 13, the transmit symbol is a DFT-s-OFDM symbol, the signal processing in step S440 includes the cyclic shift, and step S440 includes the following operations: performing frequency domain processing on the first set and the second set to obtain the frequency domain signal corresponding to the first set and the frequency domain signal corresponding to the second set; performing IFFT on the frequency domain signal corresponding to the first set and the frequency domain signal corresponding to the second set, to obtain the time domain signal corresponding to the first set and the time domain signal corresponding to the second set; performing the cyclic shift on the time domain signal corresponding to the first set and the time domain signal corresponding to the second set, to cause the start position of the first subset to correspond to the position before the first reference point of the first transmit symbol and the end position of the first subset to correspond to the position after the first reference point of the first transmit symbol, and cause the start position of the second subset to correspond to the position before the second reference point of the second transmit symbol and the end position of the second subset to correspond to the position after the second reference point of the second transmit symbol.

In this embodiment, step S440 is performed at a corresponding occasion shown in ③ in FIG. 11. The performing frequency domain processing on the first set and the second set refers to performing DFT on the first set and the second set.

Figure 17:
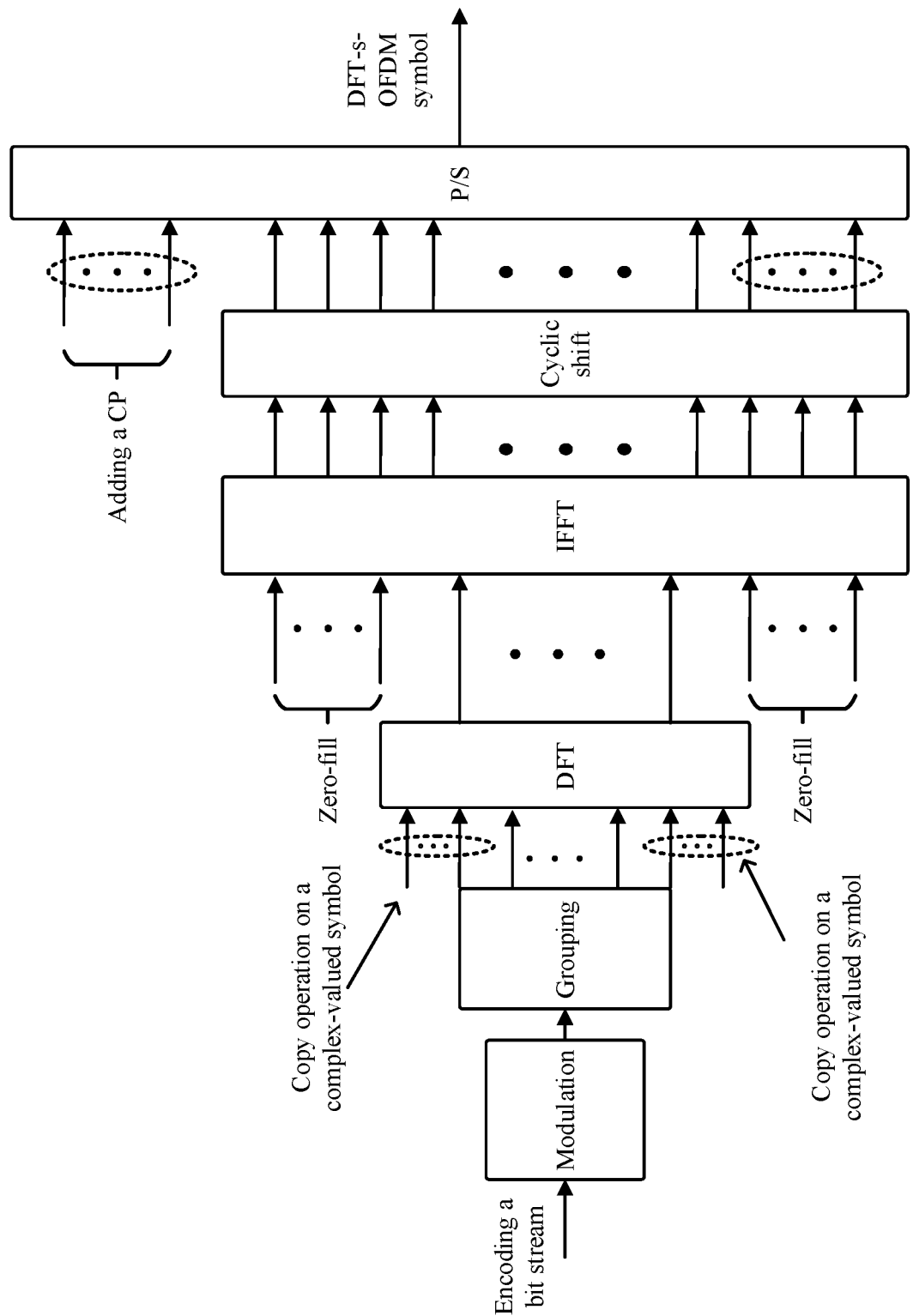
FIG. 17 is a schematic flowchart of symbol processing according to an embodiment of this application.

For example, the transmit symbol is a DFT-s-OFDM symbol. A process of generating the DFT-s-OFDM symbol in this application is shown in FIG. 17. The process includes the following steps. An encoded bit stream is modulated to obtain a plurality of modulated symbols, where the modulated symbols may be referred to as complex-valued symbols. This step may correspond to step S410 in this embodiment. The plurality of complex-valued symbols are grouped to obtain a plurality of sets. This step corresponds to step S420 in this embodiment. A complex-valued symbol copy operation is performed on the plurality of sets. This step may correspond to step S430 in this embodiment. DFT is performed on signals after the copy operation. M-points frequency domain elements obtained after DFT transform are mapped to M consecutive subcarriers (not shown in FIG. 17), and the transmitter inserts zero or maps a remaining signal to a subcarrier other than the M subcarriers. After subcarrier mapping, IFFT transform is performed on the frequency domain signal. A cyclic shift is performed on the signal after the IFFT. This step may correspond to step S440 in this embodiment. A CP is added to the signal after the cyclic shift, and then serial/parallel conversion (P/S) is performed to finally obtain the DFT-s-OFDM symbol. Phase adjustment is performed on the obtained DFT-s-OFDM symbol, so that a symbol component whose end position is a first reference point in an adjusted first transmit symbol is the same as a symbol component whose end position is a second reference point in a second transmit symbol. This step may correspond to step S450 in this embodiment.

For example, grouping in this embodiment of this application may be implemented through serial/parallel (serial/parallel, S/P) conversion.

Optionally, in the embodiment shown in FIG. 13, the transmit symbol is a DFT-s-OFDM symbol, the signal processing in step S440 includes the frequency domain weighting, and step S440 includes the following operations: performing DFT on the first set and the second set to obtain the frequency domain signal corresponding to the first set and the frequency domain signal corresponding to the second set; and performing the frequency domain weighting on the frequency domain signal corresponding to the first set and the frequency domain signal corresponding to the second set, to cause the start position of the first subset to correspond to the position before the first reference point of the first transmit symbol and the end position of the first subset to correspond to the position after the first reference point of the first transmit symbol, and cause the start position of the second subset to correspond to the position before the second reference point of the second transmit symbol and the end position of the second subset to correspond to the position after the second reference point of the second transmit symbol.

It should be understood that the frequency domain weighting in this embodiment may be equivalent to a cyclic shift of a time domain symbol.

In this embodiment, the cyclic shift is performed at a corresponding occasion shown in ② in FIG. 11.

For example, the transmit symbol is a DFT-s-OFDM symbol. A process of generating the DFT-s-OFDM symbol in this application includes the following steps. An encoded bit stream is modulated to obtain a plurality of modulated symbols, where the modulated symbols may be referred to as complex-valued symbols. This step may correspond to step S410 in this embodiment. The plurality of complex-valued symbols are grouped to obtain a plurality of sets. This step corresponds to step S420 in this embodiment. A complex-valued symbol copy operation is performed on the plurality of sets. This step may correspond to step S430 in this embodiment. DFT is performed on signals after the copy operation. The foregoing frequency domain weighting is performed on M-point frequency domain elements after the DFT transform. The M-point frequency domain elements after the frequency domain weighting are mapped to M continuous subcarriers, and the transmitter inserts zero or maps a remaining signal to a subcarrier other than the M subcarriers. After subcarrier mapping, IFFT transform is performed on the frequency domain signal. A cyclic shift is performed on the signal after the IFFT. This step may correspond to step S440 in this embodiment. A CP is added to the signal after the cyclic shift, to finally obtain the DFT-s-OFDM symbol. Phase adjustment is performed on the obtained DFT-s-OFDM symbol, so that a symbol component whose end position is a first reference point in an adjusted first transmit symbol is the same as a symbol component whose end position is a second reference point in a second transmit symbol. This step may correspond to step S450 in this embodiment.

It should be understood that, in this embodiment, the cyclic shift is equivalently implemented in a frequency domain weighting manner.

For example, when the frequency domain weighting is performed on the frequency domain signal corresponding to the first set and the frequency domain signal corresponding to the second set, a used weight value satisfies the following formula:

$$C(k, l) = C_0(l) \cdot \exp(j2\pi k n_0(l)/P)$$

where C(k, l) represents the weight value, $C_0(l)$ is related to a symbol number l, and within a transmit symbol, is a constant. A specific value of $C_0(l)$ is not limited in this application. Optionally, $C_0(l)=1 \cdot j$ represents a complex-valued symbol, that is, $j=\sqrt{-1}$.

P includes two possible values: $P=N_u$ or $P=M$, where $N_u$ represents a length of a symbol after IFFT except a CP, and M represents a quantity of DFT points.

It is assumed that a shift value after IFFT is a CP length, that is, $N_{CP,l}$. An equivalent parameter value for frequency domain weighting is as follows: When $P=N_u$, $n_0(l)=N_{CP,l}$; or when $P=M$, $n_0(l)=M \cdot N_{CP,l}/N_u$.

A shift value of the transmit symbol whose symbol number is l is $N_1+\Sigma_{o=o1}^{l} N_{CP,o}$; and when $P=N_u$, $n_0(l)=N_1+\Sigma_{o=o1}^{l} N_{CP,o}$; or when $P=M$, $n_0(l)=n_0(1)+M \cdot 1 \ N_{CP,o}/N_u$, where o1 represents a cumulative start symbol, and its value may be 0, 1, 2, or the like; and $N_1$ represents an initial shift value, and $N_1$ may be set.

Correspondingly, the following may be obtained: $n_0(1)=M \cdot N_1/N_u$.

Optionally, a value of $n_0(1)$ may be calculated by using $N_1$.

Optionally, a value of $n_0(1)$ may be defined directly by using a protocol.

Optionally, in some embodiments, an equivalent shift value of a transmit symbol whose symbol number is l+1 is $N_{CP,l+1}$ greater than an equivalent shift value of the transmit symbol whose symbol number is l.

It may be understood that the following can be obtained:

$$\frac{C(k, l+1)}{C(k, l)} = \frac{C_0(l+1)}{C_0(l)} \exp(j2\pi k N_{CP,l+1}/N_u).$$

Optionally, a value of $N_{CP,l}/N_u$ may be defined directly by using a protocol.

For example, in an existing NR protocol, a possible value is $$\frac{N_{CP,l}}{N_u} = \frac{144}{2048}.$$

In the application scenario 2, the cyclic shift is performed after the copy operation is performed and before the CP is added. For example, the cyclic shift is performed at the occasion shown in ④ in FIG. 12.

Optionally, in the embodiment shown in FIG. 13, the transmit symbol is a DFT-s-OFDM symbol or an SC-QAM symbol, the signal processing in step S440 includes the cyclic shift, and step S440 includes the following operations: directly performing the cyclic shift on the first set and the second set obtained in step S430, to cause the start position of the first subset to correspond to the position before the first reference point of the first transmit symbol and the end position of the first subset to correspond to the position after the first reference point of the first transmit symbol, and cause the start position of the second subset to correspond to the position before the second reference point of the second transmit symbol and the end position of the second subset to correspond to the position after the second reference point of the second transmit symbol.

The cyclic shift may be performed at a corresponding occasion shown in ① in FIG. 11 in this embodiment, or the cyclic shift may be performed at a corresponding occasion shown in ④ in FIG. 12 in this embodiment.

Optionally, step S430 is an intra-position copy operation in this embodiment. To be specific, step S430 includes performing the copy operation on the first set and the second set, so that both the first set and the second set have the first complex-valued symbol, and that the time domain index of the start position of the first subset formed by the first complex-valued symbol in the first set is the same as the time domain index of the start position of the second subset formed by the first complex-valued symbol in the second set, where the time domain index of the start position of the first subset is related to the CP length and symbol number.

In other words, for two sets corresponding to every two transmit symbols continuous in time domain, positions of complex-valued symbols participating in the copy operation may be determined based on symbol numbers of the transmit symbols.

For example, in step S430, the intra-position copy operation is performed on the first set and the second set, where the time domain index i of the start position of the first subset satisfies the following formula:

$$i = A + CL_{CP}(l),$$

where l represents a symbol number of the first set, l=0 represents the first transmit symbol in the signal stream, l=1 represents the second transmit symbol in the signal stream, and so on; A represents a time domain index of the first subset in the set whose symbol number l is 0; and $CL_{CP}(l)$ represents an equivalent cumulative CP length of the first set whose symbol number is l, and represents a length equivalent to a sum of lengths of CPs of the transmit symbol whose symbol number is o1 to the transmit symbol whose symbol number is l in a time domain vector before DFT, where o1 represents a cumulative start symbol and its value may be 0, 1, 2, or the like.

Lengths of CPs of transmit symbols with different symbol numbers may be the same or may be different.

For example, the equivalent cumulative CP length $CL_{CP}(l)$ of the set whose symbol number is/satisfies the following formula:

$$CL_{CP}(l) = \left\lfloor M / N_u \sum_{o=o1}^{l} N_{cp,o} \right\rfloor,$$

where M represents the quantity of DFT points, $N_u$ represents the length of the symbol after the IFFT except the CP, $N_{CP,o}$ represents the shift value (CP length) of the set whose symbol number is o after the IFFT, o1 represents the cumulative start symbol and its value may be 0, 1, 2, or the like, $\lfloor \ \rfloor$ represents round-down, and the round-down may be replaced with another rounding manner.

Optionally, in some embodiments, lengths of CPs of transmit symbols with different symbol numbers in the signal stream are all the same. In this case, in the first set and the second set after the copy operation, the time domain index i of the start position of the first subset satisfies the following formula:

$$i = A + l \cdot L_{CP},$$

where l represent the symbol number of the first set, l=0 represents the first transmit symbol in the signal stream, l=1 represents the second transmit symbol in the signal stream, and so on; A represents the time domain index of the first subset in the set whose symbol number l is 0; and $L_{CP}$ represents a length equivalent to the length of the CP in the time domain vector before the DFT.

It should be further understood that, in step S430, the time domain index of the start position of the first subset is the same as the time domain index of the start position of the second subset. Therefore, the time domain index i of the start position of the second subset also satisfies the foregoing formula.

It should be understood that, a copy position at which a copy operation is performed on two sets corresponding to two transmit symbols whose symbol numbers are l and l+1 (that is, time domain indexes of symbol components to be copied) is different from a copy position at which a copy operation is performed on two sets corresponding to two transmit symbols whose symbol numbers are l+1 and l+2.

Figure 18:
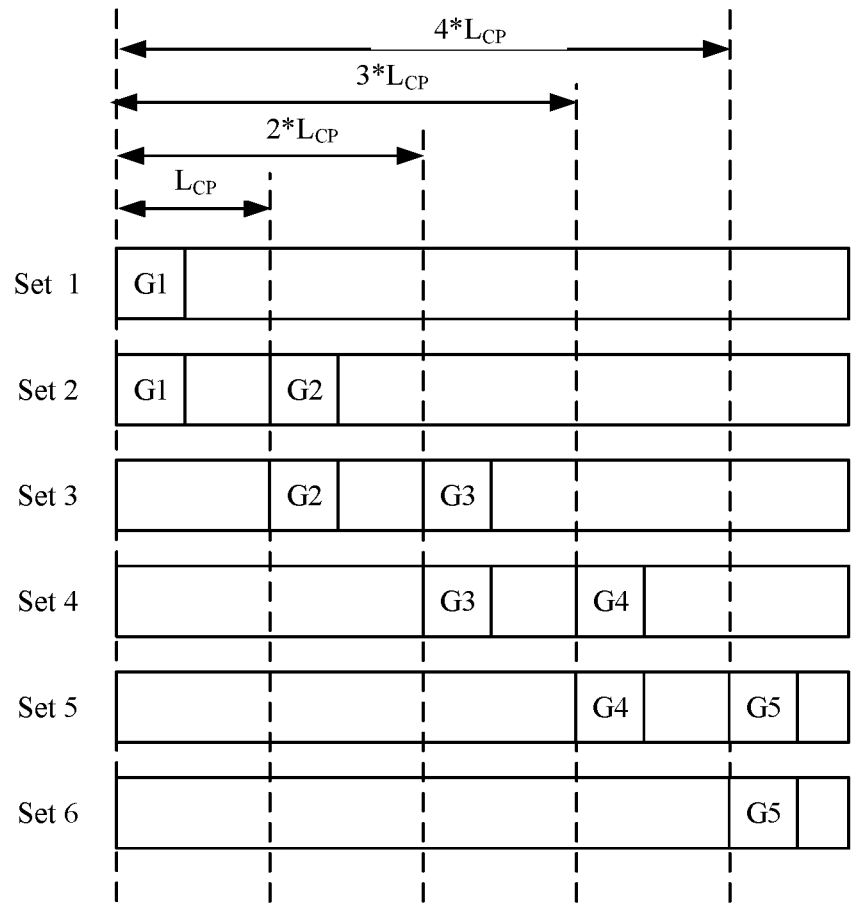
FIG. 18 is a schematic diagram for performing a copy operation on a plurality of sets according to an embodiment of this application.

For example rather than limitation, FIG. 18 is a schematic diagram of a time domain structure after an intra-position copy operation is performed on a plurality of sets corresponding to a plurality of time domain symbols continuous in time domain.

The following assumptions are made in FIG. 18: A symbol number of a set 1 is 0, a symbol number of a set 2 is 1, . . . , and a symbol number of a set 6 is 5; lengths of CPs of transmit symbols corresponding to sets with different symbol numbers are the same; and a time domain index A of a subset participating in the copy operation in the set 1 whose symbol number is 0 is 0.

As shown in FIG. 18, both the set 1 and the set 2 have a subset G1 formed by a complex-valued symbol, and a position of the subset G1 in the set 1 is the same as a position of the subset G1 in the set 2. Both the set 2 and the set 3 have a subset G2, and a position of the subset G2 in the set 2 is the same as a position of the subset G2 in the set 3, and so on. For the set 1 and the set 2, a time domain index of the subset G1 is 0. For the set 2 and the set 3, a time domain index of the subset G2 is $L_{CP}$. For the set 3 and the set 4, a time domain index of the subset G3 is $i=A+l \cdot L_{CP}=2L_{CP}$. For the set 4 and the set 5, a time domain index of the subset G4 is $i=A+l \cdot 3L_{CP}$. For the set 5 and the set 6, a time domain index of the subset G5 is $i=A+l \cdot L_{CP}=4L_{CP}$. $L_{CP}$ represents a length equivalent to a length of a CP in a time domain vector before DFT.

Optionally, in some embodiments, step S430 includes: performing the copy operation on the first set and the second set, so that both the first set and the second set have the first complex-valued symbol, and that the time domain index of the start position of the first subset formed by the first complex-valued symbol in the first set is the same as the time domain index of the start position of the second subset formed by the first complex-valued symbol in the second set, where the start position of the first subset corresponds to the position before the first reference point of the first transmit symbol, the end position of the first subset corresponds to the position after the first reference point of the first transmit symbol (that is, the position after the third reference point of the first transmit symbol), the start position of the second subset corresponds to a position before a first reference point of the second transmit symbol, and the end position of the second subset corresponds to a position after the first reference point of the second transmit symbol (that is, a position after a third reference point of the second transmit symbol). The first reference point represents an end position of the transmit symbol, the second reference point represents a position of a truncated CP in the transmit symbol, and the third reference point represents a start position of the transmit symbol.

In step S440 in this embodiment, the cyclic shift may not be performed on the first set, and the cyclic shift may be performed only on the second set.

Optionally, in some embodiments, the signal processing in step S440 includes the cyclic shift, a cyclic shift step length for the first set is determined based on the CP length and a symbol number of the first transmit symbol, and a cyclic shift step length for the second set is related to a symbol number of the second transmit symbol based on the CP length.

For example, l represents a symbol number of a transmit symbol. It is assumed that l=0 corresponds to the first transmit symbol in the signal stream, and that l=1 corresponds to the second transmit symbol in the signal stream, and so on. Under this assumption, in step S440, a cyclic shift step length Z(l) for the set whose symbol number is l satisfies the following formula:

$$Z(l) = Z_0 + \sum_{o=o1}^{l} N_{cp,o},$$

where Z(0) represents a cyclic shift step length for the set whose symbol number is 0, $\Sigma_{o=o1}^{l} N_{CP,o}$ represents an equivalent cumulative CP length of the set whose symbol number is l, and represents a length equivalent to a sum of lengths of CPs of the transmit symbol whose symbol number is 01 to the transmit symbol whose symbol number is l in a time domain vector after IFFT.

Lengths of CPs of transmit symbols with different symbol numbers may be the same or may be different.

Optionally, in some embodiments, lengths of CPs of transmit symbols with different symbol numbers in the signal stream are all the same, and the cyclic shift step length Z(l) for the set whose symbol number is l satisfies the following formula:

$$Z(l)=Z_0+l \cdot N_{CP},$$

where $Z_0$ represents the cyclic shift step length for the set whose symbol number is 0, and the cyclic shift step length for the set may be a preset value, for example, may be an empirical value; and $N_{CP}$ represents a length equivalent to the CP length in the time domain vector after the IFFT.

Figure 19:
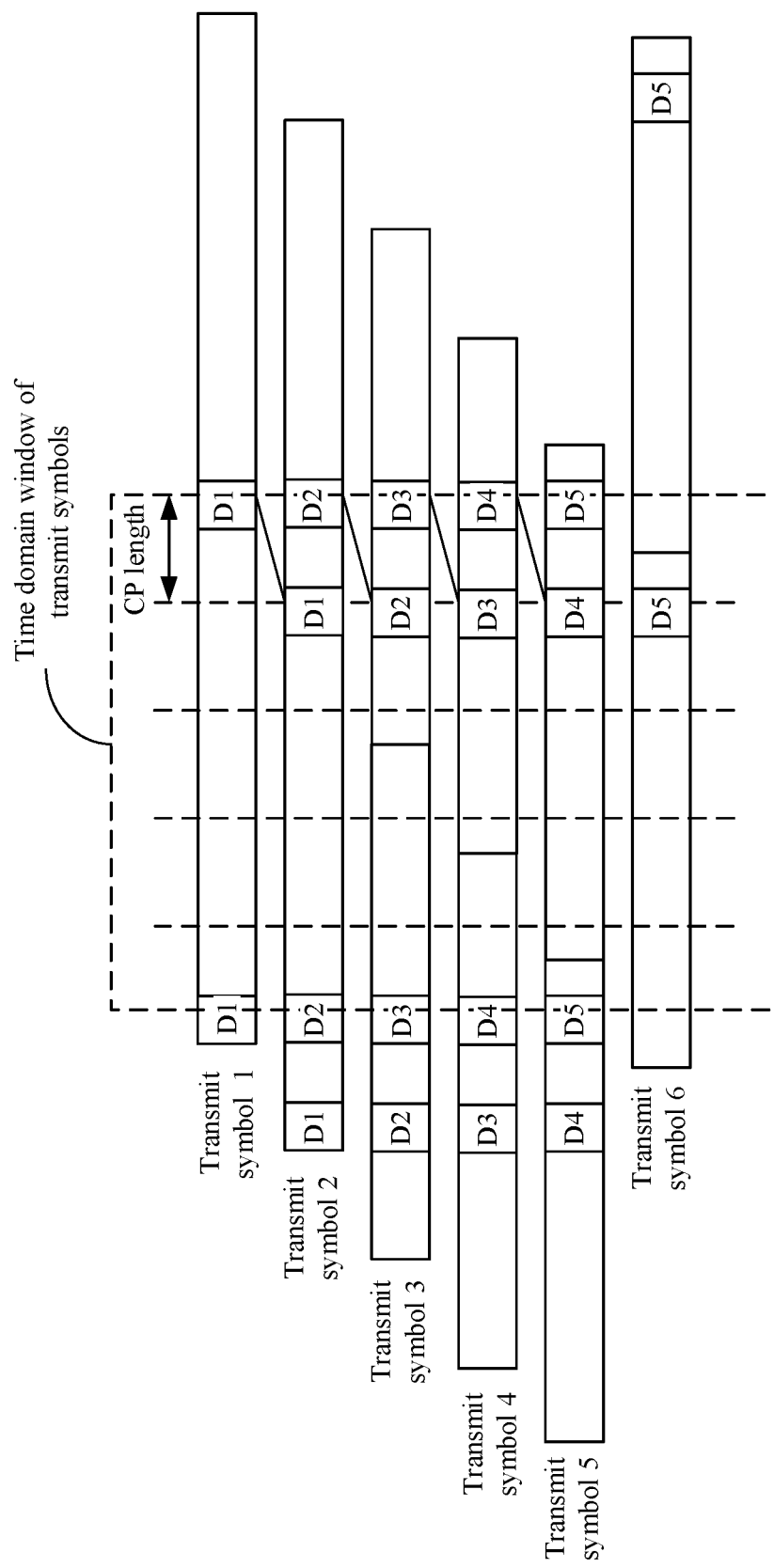
FIG. 19 is a schematic diagram for performing a cyclic shift on a plurality of symbols according to an embodiment of this application.

FIG. 19 is a schematic diagram for performing a copy operation and signal processing (a cyclic shift or frequency domain weighting) on a plurality of sets corresponding to a plurality of time domain symbols continuous in time domain.

For example rather than limitation, six transmit symbols located in a time domain window of transmit symbols in FIG. 19 represent transmit symbols that are continuous in time domain and are generated from the sets 1 to 6 processed in step S430 and step S440. In FIG. 19, the CP of the transmit symbol is not considered. In FIG. 19, symbol numbers of the transmit symbol 1 to the transmit symbol 6 are 0, 1, . . . , and 5 in sequence.

It should be noted that, in FIG. 19, for better understanding the cyclic shift, one time domain window of transmit symbols is drawn. The time domain window is merely for ease of understanding and description, and does not limit this embodiment of this application.

It may be equivalently considered that the transmit symbol 1 in FIG. 19 is a transmit symbol obtained by performing the signal processing (cyclic shift or frequency domain weighting) on the set 1 in FIG. 18, and the transmit symbol 2 in FIG. 19 is a transmit symbol obtained by performing the signal processing (cyclic shift or frequency domain weighting) on the set 2 in FIG. 18, and so on, and the transmit symbol 6 in FIG. 19 is a transmit symbol obtained by performing the signal processing (cyclic shift or frequency domain weighting) on the set 6 in FIG. 18.

It may be further understood from FIG. 19 that a cyclic shift step length for a transmit symbol whose symbol number is l+1 differs from a cyclic shift step length for a transmit symbol whose symbol number is l by one CP length. It is assumed herein that CP lengths of transmit symbols with different symbol numbers are the same.

This embodiment of this application may be applied to generation of a DFT-s-OFDM symbol and an SC-QAM symbol. In addition, this application may be further applied to generation of a reference signal, for example, a DMRS.

For a DFT-s-OFDM waveform, a reference signal is usually generated in frequency domain and directly mapped to a subcarrier.

In a possible implementation, when the transmit symbol is a reference signal, the copy operation in this embodiment of this application is performed after a frequency domain sequence of the reference signal is converted to a time domain sampling point.

Considering that the reference signal is used for channel estimation, to ensure channel performance, it is not expected that the reference signal includes a time domain sampling point of another symbol.

Optionally, in this embodiment of this application, if a transmit symbol x is a reference signal, and both transmit symbols before and after the transmit symbol x are non-reference signals, forward copy is used in step S430 for a transmit symbol (including the reference signal x) before the transmit symbol x, and backward copy is used in step S430 for a reference signal (including the reference signal x) after the transmit symbol x.

Optionally, in the foregoing backward copy embodiments, the first transmit symbol may be a reference signal, and the second transmit symbol may be a non-reference signal.

For example, the first transmit symbol is a DMRS.

Optionally, in the foregoing forward copy embodiments, the first transmit symbol is a non-reference signal, and the second transmit symbol may be a reference signal.

For example, the second transmit symbol is a DMRS.

In this embodiment, the inter-symbol guard period can be flexibly configured, and integrity of the reference signal can be ensured.

Figure 20:
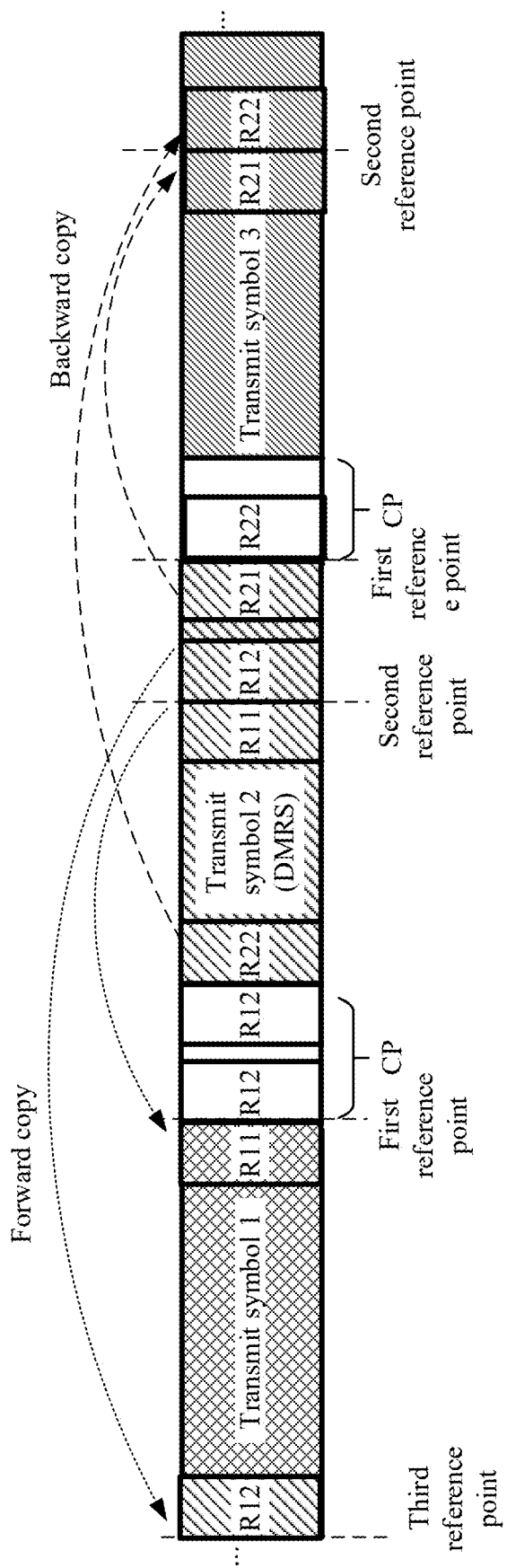
FIG. 20 is another schematic diagram of time domain structures of transmit symbols according to an embodiment of this application.

FIG. 20 is a schematic diagram of time domain structures of three transmit symbols (1, 2, 3). The transmit symbol 2 is a DMRS, and the transmit symbol 1 and the transmit symbol 2 are non-reference signals. A copy relationship between a set 2 corresponding to the transmit symbol 2 and a set 1 corresponding to the transmit symbol 1 is forward copy, and a copy relationship between the set 2 corresponding to the transmit symbol 2 and a set 3 corresponding to the transmit symbol 3 is backward copy.

It can be learned from FIG. 20, a symbol component R12 whose start position is a second reference point in the transmit symbol 2 is copied to the transmit symbol 1, and a start position of the symbol component R12 copied to the transmit symbol 1 is a third reference point of the transmit symbol 1. A symbol component R11 whose end position is the second reference point in the transmit symbol 2 is copied to the transmit symbol 1, and an end position of the symbol component R11 copied to the transmit symbol 1 is a first reference point of the transmit symbol 1. A symbol component R21 whose end position is a first reference point in the transmit symbol 2 is copied to the transmit symbol 3, and an end position of the symbol component R21 copied to the transmit symbol 3 is a second reference point of the transmit symbol 3. A symbol component R22 whose start position is a third reference point in the transmit symbol 2 is copied to the transmit symbol 3, and a start position of the symbol component R22 copied to the transmit symbol 3 is a second reference point of the transmit symbol 3. The first reference point represents the end position of the transmit symbol, the second reference point represents a position of a truncated CP of the transmit symbol, and the third reference point represents the start position (an end position of the CP) of the transmit symbol, as shown in FIG. 20.

As shown in FIG. 20, a copy relationship between the transmit symbol 2 and the transmit symbol 1 is forward copy, that is, the symbol components R11 and R12 in the DMRS are copied to the symbol 1, and by analogy, a symbol component D0 in the transmit symbol 1 is copied to a symbol (not shown in FIG. 20) before the symbol 1. A copy relationship between the DMRS and the transmit symbol 3 is backward copy, that is, the symbol components R21 and R22 in the DMRS are copied to the transmit symbol 3, and by analogy, a symbol component in the transmit symbol 3 is copied to a symbol (not shown in FIG. 20) after the transmit symbol 2.

It should be understood that, in this embodiment, the inter-symbol guard period can be flexibly configured, and accuracy of the reference signal can be ensured, thereby ensuring channel performance.

When two or more transmit symbols continuous in time domain are all reference signals, this application provides a symbol processing method. The method includes the following steps.

Step (1): Obtain a plurality of complex-valued symbols.

Step (2): Group the plurality of complex-valued symbols into a plurality of sets, where the plurality of sets include a first set and a second set, the first set corresponds to a first transmit symbol, the second set corresponds to a second transmit symbol, the first transmit symbol and the second transmit symbol are continuous in time domain, the first transmit symbol is located before the second transmit symbol, and a complex-valued symbol in a first subset in the first set is the same as a complex-valued symbol in a second subset in the second set.

For example, a time domain vector corresponding to the first set is the same as a time domain vector corresponding to the second set.

Step (3): Perform signal processing on the first set and the second set to generate the first transmit symbol and the second transmit symbol.

The signal processing includes a cyclic shift or frequency domain weighting. The signal processing causes a start position of the first subset to correspond to a position before a first reference point of the first transmit symbol and an end position of the first subset to correspond to a position after the first reference point of the first transmit symbol, and causes a start position of the second subset to correspond to a position before a second reference point of the second transmit symbol and an end position of the second subset to correspond to a position after the second reference point of the second transmit symbol. The first reference point represents the end position of the transmit symbol, and the second reference point represents a position of a truncated CP of the transmit symbol.

Step (4): Perform phase adjustment on the first transmit symbol and/or the second transmit symbol, so that a symbol component whose end position is the first reference point in the first transmit symbol is the same as a symbol component whose end position is the second reference point in the second transmit symbol after the adjustment.

Optionally, the transmit symbols corresponding to the first set and the second set are reference signals, for example, DMRSs.

It should be understood that, in this embodiment, no copy operation is performed on the first set and the second set. When the transmit symbols corresponding to the first set and the second set are reference signals, it can be ensured that guard periods of the reference signals can be flexibly configured while accuracy of the reference signals is ensured.

Based on the foregoing description, in this embodiment of this application, the copy operation and the signal processing including the cyclic shift or frequency domain weighting are performed on the two sets corresponding to the two transmit symbols continuous in time domain, so that the first transmit symbol and the second transmit symbol having the time domain structures shown in FIG. 3 can be generated. Therefore, in this embodiment of this application, given a fixed CP length, an inter-symbol guard period can be flexibly configured. In addition, performing the phase adjustment on the transmit symbol can ensure implementation of this solution, that is, ensure that the inter-symbol guard period is flexibly configured.

In this application, the phase adjustment is performed on the transmit symbols, so that the symbol component whose end position is the first reference point in the first transmit symbol is the same as the symbol component whose end position is the second reference point in the second transmit symbol after the adjustment. In this way, the inter-symbol guard period can be flexibly configured, and a length of the protection interval can be flexibly configured based on a user requirement.

It should be understood that, in addition to embodiments provided in this specification, any other solution in which a transmit symbol having the time domain structure shown in FIG. 3 can be generated also falls within the protection scope of this application.

Embodiments described in this specification may be independent solutions, or may be combined based on internal logic. These solutions all fall within the protection scope of this application.

It may be understood that, in the foregoing method embodiments, an execution body may be a terminal device or a component (for example, a chip or a circuit) that may be used in the terminal device, or may be a network device or a component (for example, a chip or a circuit) that may be used in the network device.

The foregoing describes the method embodiments provided in embodiments of this application, and the following describes apparatus embodiments provided in embodiments of this application. It should be understood that description of the apparatus embodiments corresponds to the description of the method embodiments. Therefore, for content that is not described in detail, refer to the foregoing method embodiments. For brevity, details are not described herein again.

Figure 21:
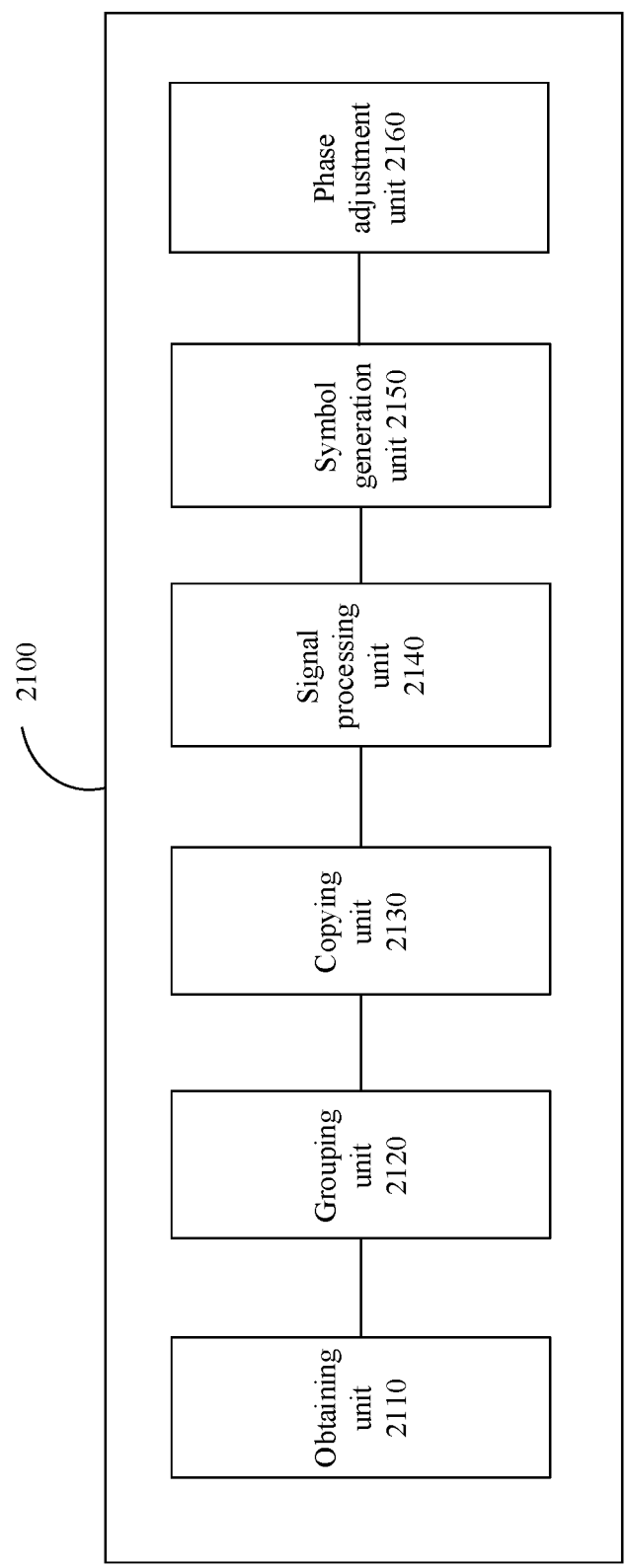
FIG. 21 is a schematic block diagram of a symbol processing apparatus according to an embodiment of this application.

FIG. 21 is a schematic block diagram of a symbol processing apparatus 2100 according to an embodiment of this application. The apparatus 2100 is configured to perform the foregoing method embodiment. The apparatus 2100 may include the following units:

an obtaining unit 2110, configured to obtain a plurality of complex-valued symbols;

a grouping unit 2120, configured to group the plurality of complex-valued symbols into a plurality of sets, where each set corresponds to one transmit symbol, the plurality of sets include a first set corresponding to a first transmit symbol and a second set corresponding to a second transmit symbol, the first transmit symbol and the second transmit symbol are continuous in time domain, and the first transmit symbol is located before the second transmit symbol;
a copying unit 2130, configured to perform a copy operation on the first set and the second set, so that both the first set and the second set have a first complex-valued symbol, where a time domain index of a start position of a first subset formed by the first complex-valued symbol in the first set is the same as a time domain index of a start position of a second subset formed by the first complex-valued symbol in the second set;
a signal processing unit 2140, configured to perform signal processing on the first set and the second set after the copy operation, where the signal processing includes a cyclic shift or frequency domain weighting, and the signal processing causes a start position of the first subset to correspond to a position before a first reference point of the first transmit symbol and an end position of the first subset to correspond to a position after the first reference point of the first transmit symbol, and causes a start position of the second subset to correspond to a position before a second reference point of the second transmit symbol and an end position of the second subset to correspond to a position after the second reference point of the second transmit symbol, where the first reference point represents an end position of the transmit symbol, and the second reference point represents a position of a truncated CP of the transmit symbol;
a symbol generation unit 2150, configured to generate the first transmit symbol and the second transmit symbol based on signals after the signal processing; and
a phase adjustment unit 2160, configured to perform phase adjustment on the first transmit symbol and/or the second transmit symbol, so that a symbol component whose end position is the first reference point in the first transmit symbol is the same as a symbol component whose end position is the second reference point in the second transmit symbol after the adjustment.

Optionally, in some embodiments, the phase adjustment unit 2160 is specifically configured to perform the phase adjustment on the first transmit symbol and/or the second transmit symbol based on one or more of the following information: an IFFT size, a CP length, a frequency resource position, a subcarrier center position, a subcarrier spacing, a sampling interval, a transmit symbol period, and a transmit symbol index.

Optionally, in some embodiments, the phase adjustment unit 2160 is specifically configured to perform the phase adjustment on the first transmit symbol and/or the second transmit symbol based on a phase difference between the first transmit symbol and the second transmit symbol.

Optionally, in some embodiments, the phase difference between the first transmit symbol and the second transmit symbol satisfies either of the following formulas:

$$e^{\left(j\frac{2\pi f_0 \Delta f T_{CP,l}}{N}\right)} \text{ or } e^{\left(j\frac{2\pi f_0 \Delta f N_{CP,l}}{N}\right)},$$

where $f_0$ represents the subcarrier center position, $\Delta f$ represents the subcarrier spacing, $T_{CP,l}$ represents duration of a CP of an $l^{th}$ transmit symbol, $N_{cp,l}$ represents a quantity of sampling points of the CP of the $l^{th}$ transmit symbol, l represents the transmit symbol index, j represents a complex-valued symbol, and N represents the IFFT size.

Optionally, in some embodiments, the phase adjustment unit 2160 is specifically configured to divide the first transmit symbol by a phase compensation factor; or multiply the second transmit symbol by the phase compensation factor; or multiply the first transmit symbol by a first phase factor, and multiply the second transmit symbol by a second phase factor, where a difference between the first phase factor and the second phase factor is the phase compensation factor.

Optionally, in this embodiment, the first transmit symbol is a reference signal, and the second transmit symbol is a non-reference signal.

Optionally, in this embodiment, the first transmit symbol is a non-reference signal, and the second transmit symbol is a reference signal.

Therefore, in this application, when a CP length is fixed, it can be ensured that an inter-symbol guard period can be flexibly configured, and further, a length of the guard period can be flexibly configured based on a user requirement.

Figure 22:
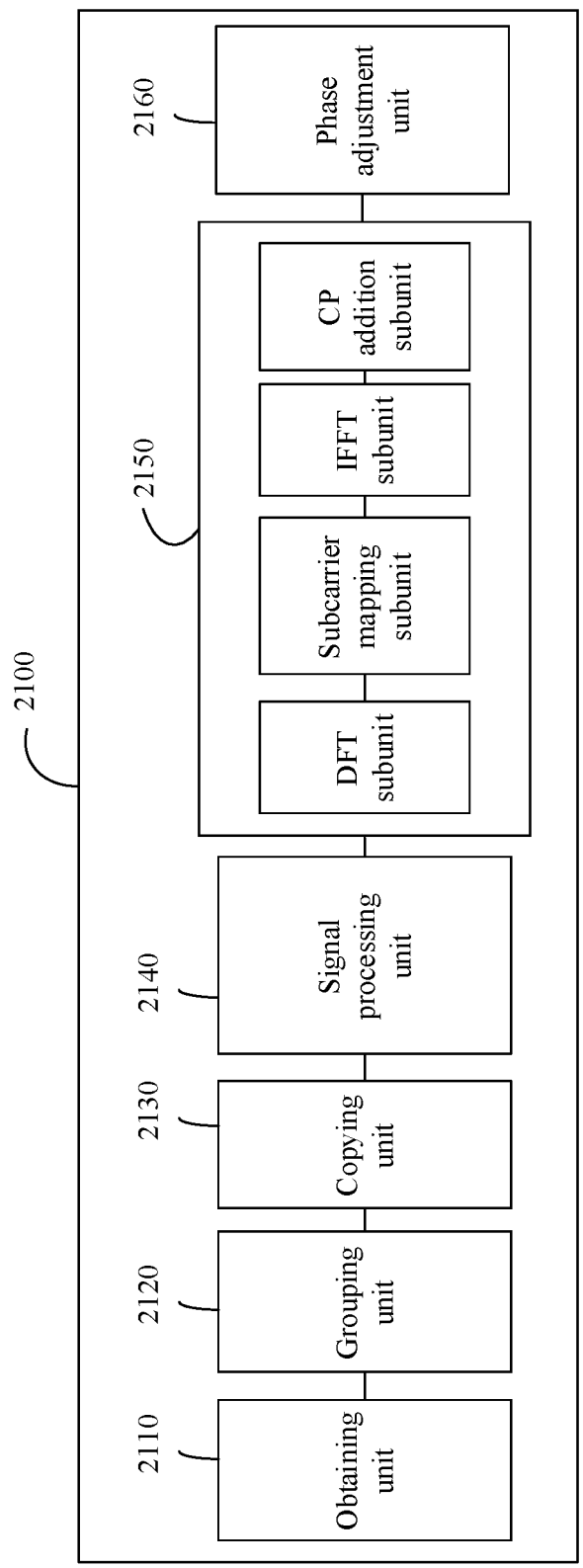
FIG. 22 is another schematic block diagram of a symbol processing apparatus according to an embodiment of this application.

Optionally, when the apparatus 2100 is applied to an application scenario 1, for example, as shown in FIG. 22, the symbol generation unit 2150 may include a DFT subunit, a subcarrier mapping subunit, an IFFT subunit, and a CP addition subunit.

In FIG. 22, the signal processing unit 2140 is located between the copying unit 2130 and the symbol generation unit 2150. In this case, the signal processing unit 2140 may be referred to as a cyclic shift unit.

Optionally, the signal processing unit 2140 may be located in the symbol generation unit 2150.

For example, the signal processing unit 2140 is located between the DFT subunit and the IFFT subunit. In this case, the signal processing unit 2140 may be referred to as a frequency domain weighting unit.

For another example, the signal processing unit 2140 is located between the IFFT subunit and the CP adding subunit. In this case, the signal processing unit 2140 may be referred to as a cyclic shift unit.

Figure 23:
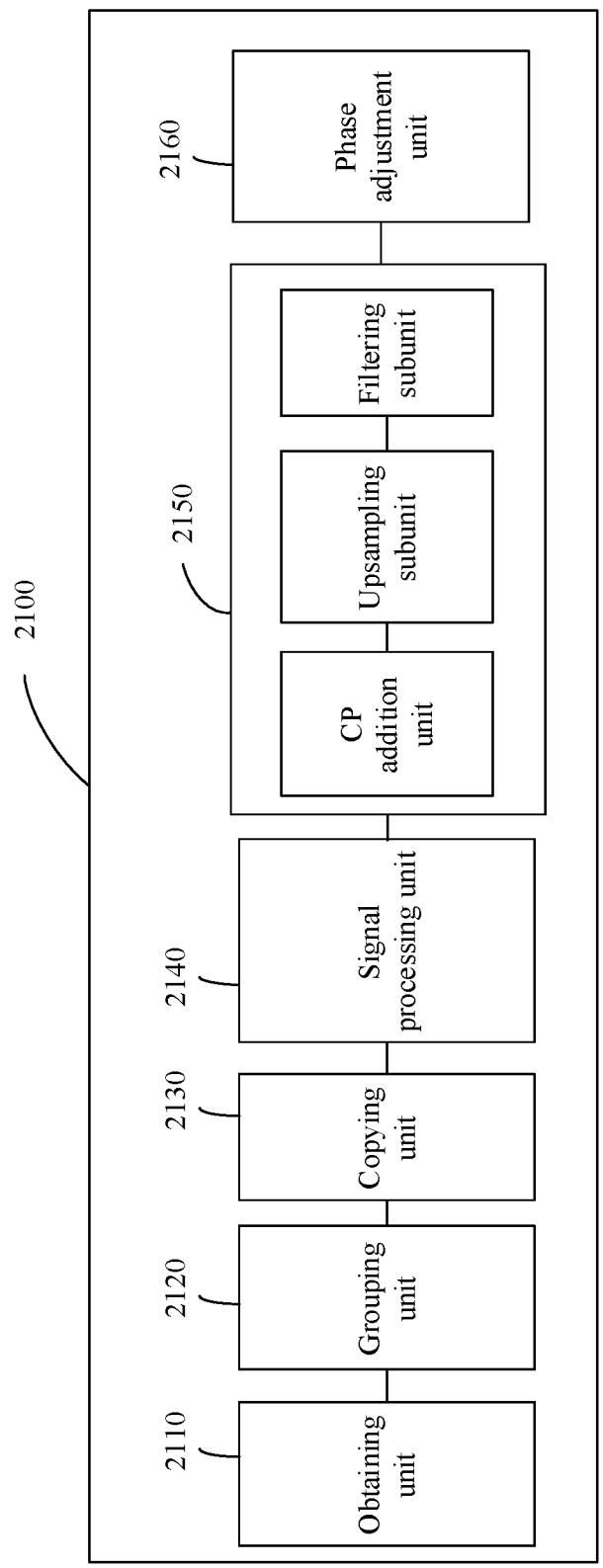
FIG. 23 is still another schematic block diagram of a symbol processing apparatus according to an embodiment of this application.

Optionally, when the apparatus 2100 is applied to an application scenario 2, for example, as shown in FIG. 23, the symbol generation unit 2150 may include a CP addition subunit, an upsampling subunit, and a filtering subunit. In this case, the signal processing unit 2140 may be referred to as a cyclic shift unit.

Optionally, in another embodiment of the apparatus 2100, the obtaining unit 2110 is configured to obtain a plurality of complex-valued symbols. The grouping unit 2120 is configured to group the plurality of complex-valued symbols into a plurality of sets, where the plurality of sets include a first set and a second set, the first set corresponds to a first transmit symbol, the second set corresponds to a second transmit symbol, the first transmit symbol and the second transmit symbol are continuous in time domain, the first transmit symbol is located before the second transmit symbol, and a complex-valued symbol in a first subset in the first set is the same as a complex-valued symbol in a second subset in the second set. The signal processing unit 2140 is configured to perform signal processing on the first set and the second set, where the signal processing includes a cyclic shift or frequency domain weighting, and the signal processing causes a start position of the first subset to correspond to a position before a first reference point of the first transmit symbol and an end position of the first subset to correspond to a position after the first reference point of the first transmit symbol, and causes a start position of the second subset to correspond to a position before a second reference point of the second transmit symbol and an end position of the second subset to correspond to a position after the second reference point of the second transmit symbol, where the first reference point represents an end position of the transmit symbol, and the second reference point represents a position of a truncated CP of the transmit symbol. The symbol generation unit 2150 is configured to generate the first transmit symbol and the second transmit symbol based on signals after the signal processing. The phase adjustment unit 2160 is configured to perform phase adjustment on the first transmit symbol and/or the second transmit symbol, so that a symbol component whose end position is the first reference point in the first transmit symbol is the same as a symbol component whose end position is the second reference point in the second transmit symbol after the adjustment.

Optionally, in this embodiment, the first transmit symbol and the second transmit symbol are both reference signals.

Optionally, the obtaining unit 2110, the grouping unit 2120, the copying unit 2130, the signal processing unit 2140, the symbol generation unit 2150, and the phase adjustment unit 2160 may be implemented by software, or may be implemented by hardware, or may be implemented by hardware and software. In addition, the obtaining unit 2110, the grouping unit 2120, the copying unit 2130, the signal processing unit 2140, the symbol generation unit 2150, and the phase adjustment unit 2160 may be different chips, or may be integrated into one chip or an integrated circuit.

Optionally, in the foregoing embodiment, the obtaining unit 2110, the grouping unit 2120, the copying unit 2130, the signal processing unit 2140, the symbol generation unit 2150, and the phase adjustment unit 2160 may all be implemented by using a processor or a processor-related circuit.

Figure 24:
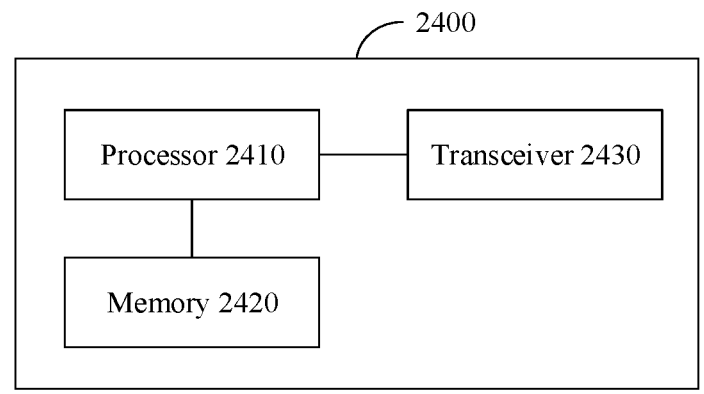
FIG. 24 is yet another schematic block diagram of a symbol processing apparatus according to an embodiment of this application.

As shown in FIG. 24, an embodiment of this application further provides a symbol processing apparatus 2400. The apparatus 2400 includes a processor 2410, a memory 2420, and a transceiver 2430. The memory 2420 stores a program. The processor 2410 is configured to execute the program stored in the memory 2420, and execution of the program stored in the memory 2420 enables the apparatus 2400 to perform the foregoing method embodiment.

An embodiment of this application further provides a communication apparatus. The communication apparatus may be a terminal device or a chip. The communication apparatus may be configured to perform the foregoing method embodiments.

Figure 25:
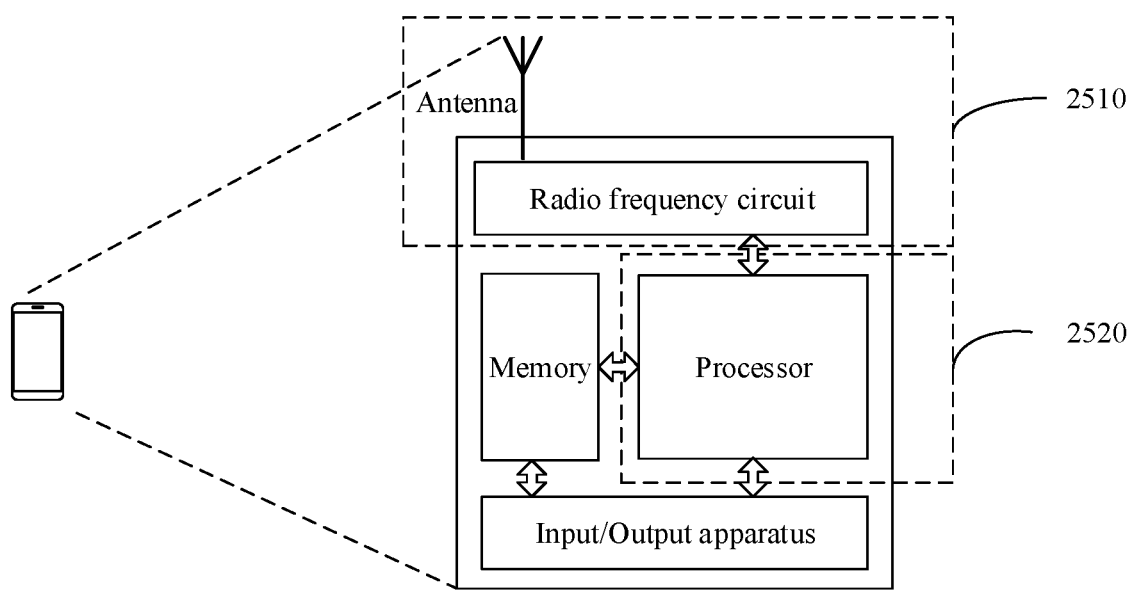
FIG. 25 is a schematic block diagram of a terminal device according to an embodiment of this application.

When the communication apparatus is a terminal device, FIG. 25 is a simplified schematic diagram of a structure of the terminal device. For ease of understanding and illustration, an example in which the terminal device is a mobile phone is used in FIG. 25. As shown in FIG. 25, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is configured to store the software program and the data. The radio frequency circuit is mainly configured to: perform conversion between a baseband signal and a radio frequency signal, and process the radio frequency signal. The antenna is mainly configured to send and receive the radio frequency signal in an electromagnetic wave form. The input/output apparatus, such as a touchscreen, a display, or a keyboard, is mainly configured to: receive data entered by a user and output data to the user.

It should be noted that some types of terminal devices may have no input/output apparatus.

When data needs to be sent, the processor performs baseband processing on the to-be-sent data, and outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 25 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna that has sending and receiving functions and the radio frequency circuit may be considered as a transceiver unit of the terminal device, and the processor that has a processing function may be considered as a processing unit of the terminal device.

As shown in FIG. 25, the terminal device includes a transceiver unit 2510 and a processing unit 2520. The transceiver unit 2510 may also be referred to as a transceiver, a transceiver machine, a transceiver apparatus, or the like. The processing unit 2520 may also be referred to as a processor, a processing board, a processing module, a processing apparatus, or the like. Optionally, a component that is in the transceiver unit 2510 and that is configured to implement a receiving function may be considered as a receiving unit, and a component that is in the transceiver unit 2510 and that is configured to implement a sending function may be considered as a sending unit. In other words, the transceiver unit 2510 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

For example, in an implementation, the processing unit 2520 is configured to perform the foregoing method embodiments. The transceiver unit 2510 is configured to perform related receiving and sending operations in the foregoing method embodiments. For example, the transceiver unit 2510 is configured to send or receive a DFT-s-OFDM symbol or an SC-QAM symbol.

It should be understood that FIG. 25 is merely an example instead of a limitation. The terminal device including the transceiver unit and the processing unit may not depend on the structure shown in FIG. 25.

When the communication apparatus is a chip, the chip includes a transceiver unit and a processing unit. The transceiver unit may be an input/output circuit or a communications interface. The processing unit may be a processor, a microprocessor, or an integrated circuit integrated on the chip.

Figure 26:
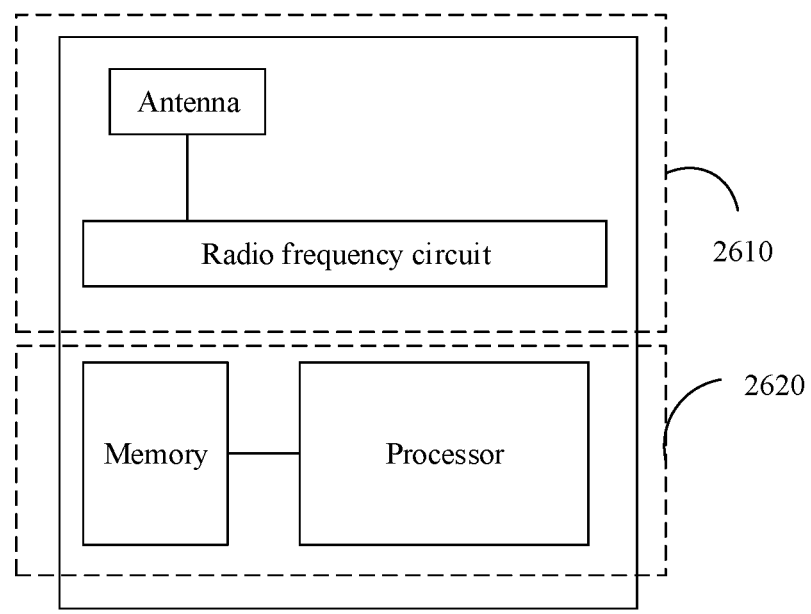
FIG. 26 is a schematic block diagram of a network device according to an embodiment of this application.

An embodiment of this application further provides a communication apparatus. The communication apparatus may be a network device or a chip. The communication apparatus may be configured to perform the foregoing method embodiments. When the communication apparatus is a network device, for example, a base station, FIG. 26 is a schematic diagram of a structure of a simplified base station. The base station includes a part 2610 and a part 2620. The part 2610 is mainly configured to: send and receive a radio frequency signal, and perform conversion between the radio frequency signal and a baseband signal. The part 2620 is mainly configured to: perform baseband processing, control the base station, and the like. The part 2610 may usually be referred to as a transceiver unit, a transceiver machine, a transceiver circuit, a transceiver, or the like. The part 2620 is usually a control center of the base station, and may usually be referred to as a processing unit, and is configured to control the base station to perform processing operations on a network device side in the foregoing method embodiments.

The transceiver unit of the part 2610 may also be referred to as a transceiver machine, a transceiver, or the like, and includes an antenna and a radio frequency unit. The radio frequency unit is mainly configured to perform radio frequency processing. Optionally, a component that is in the part 2610 and that is configured to implement a receiving function may be considered as a receiving unit, and a component that is in the part 2610 and that is configured to implement a sending function may be considered as a sending unit. In other words, the part 2610 includes the receiving unit and the sending unit. The receiving unit may also be referred to as a receiver machine, a receiver, a receiver circuit, or the like. The sending unit may be referred to as a transmitter machine, a transmitter, a transmit circuit, or the like.

The part 2620 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors.

For example, in an implementation, the part 2620 is configured to perform the foregoing method embodiments. The part 2610 is configured to perform related receiving and sending operations in the foregoing method embodiments. For example, the part 2610 is configured to send or receive a DFT-s-OFDM symbol or an SC-QAM symbol.

It should be understood that FIG. 26 is merely an example instead of a limitation. The network device including the transceiver unit and the processing unit may not depend on the structure shown in FIG. 26.

When the communication apparatus is a chip, the chip includes a transceiver unit and a processing unit. The transceiver unit may be an input/output circuit or a communications interface. The processing unit is a processor, a microprocessor, or an integrated circuit integrated on the chip.

The terminal device in embodiments of this application includes a handheld device, a vehicle-mounted device, a wearable device, or a computing device that has a wireless communication function. For example, the terminal device may be user equipment (UE), an access terminal, a subscriber unit, a subscriber station, a mobile station, a remote station, a remote terminal, a mobile device, a user terminal, a terminal, a wireless communication device, a user agent, or a user apparatus. For example, the terminal device may be a mobile phone (mobile phone), a tablet computer, or a computer with a wireless transceiver function. The terminal device may alternatively be a virtual reality (virtual reality, VR) terminal device, an augmented reality (augmented reality, AR) terminal device, a wireless terminal in industrial control, a wireless terminal in self-driving, a wireless terminal in telemedicine, a wireless terminal in a smart grid, a wireless terminal in a smart city (smart city), a wireless terminal in a smart home (smart home), or the like. The terminal device may be a terminal device in a 5G network, a terminal device in a future evolved public land mobile communication network (PLMN), or the like.

The network device in embodiments of this application may be configured to communicate with one or more terminal devices, or may be configured to communicate with one or more base stations having some terminal functions (for example, communication between a macro base station and a micro base station, such as an access point). The network device may be referred to as a base station. The base station may be in a plurality of forms, for example, a macro base station, a micro base station, a relay station, and an access point. For example, the network device in embodiments of this application may be a base station in new radio (NR), or may be a base transceiver station (BTS) in a global system for mobile communications (GSM) or code division multiple access (CDMA), or may be a NodeB (NB) in a wideband code division multiple access (WCDMA) system, or may be an evolved NodeB (eNB or eNodeB) in a long term evolution (LTE) system. A base station in 5G NR may also be referred to as a transmission and reception point (TRP) or a next generation NodeB (gNB).

An embodiment of this application further provides a computer-readable storage medium. A computer program is stored in the computer-readable storage medium. When the computer program is executed by a computer, the computer is enabled to implement the foregoing method embodiments.

An embodiment of this application further provides a computer program product including instructions. When the instructions are executed by a computer, the computer is enabled to implement the foregoing method embodiments.

For explanations and beneficial effects of related content of either of the communication apparatuses provided above, refer to corresponding method embodiments provided above. Details are not described herein again.

In embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or a functional module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry instructions and/or data.

It should be understood that, the processor mentioned in embodiments of this application may be a central processing unit (CPU), the processor may alternatively be another general-purpose processor, a digital signal processor (DSP), an application-specific integrated circuit (ASIC), a field programmable gate array (FPGA) or another programmable logical device, discrete gate or transistor logical device, discrete hardware component, or the like. The general-purpose processor may be a microprocessor, or the processor may be any conventional processor or the like.

It may be further understood that the memory mentioned in embodiments of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA, or another programmable logic device, discrete gate or transistor logic device, or discrete hardware component, the memory (a storage module) is integrated into the processor.

It should be noted that the memory described in this specification aims to include but is not limited to these memories and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, or a network device) to perform all or some of the steps in the method described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing description is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A symbol processing method, comprising:
obtaining a plurality of complex-valued symbols;
grouping the plurality of complex-valued symbols into a plurality of sets, wherein each set corresponds to one transmit symbol, the plurality of sets comprise a first set corresponding to a first transmit symbol and a second set corresponding to a second transmit symbol, the first transmit symbol and the second transmit symbol are continuous in time, and the first transmit symbol is located before the second transmit symbol;

performing a copy operation on the first set and the second set, so that both the first set and the second set have a first complex-valued symbol, wherein a time domain index of a start position of a first subset formed by the first complex-valued symbol in the first set is the same as a time domain index of a start position of a second subset formed by the first complex-valued symbol in the second set;

after the copy operation, performing signal processing on the first set and the second set to generate the first transmit symbol and the second transmit symbol, wherein the signal processing comprises a cyclic shift or frequency domain weighting, and the signal processing causes the start position of the first subset to correspond to a position before a first reference point of the first transmit symbol and an end position of the first subset to correspond to a position after the first reference point of the first transmit symbol, wherein the start position of the first subset in the first set corresponds to a tail position of the first transmit symbol, and the end position of the first subset corresponds to a header position of the first transmit symbol, and further causes the start position of the second subset to correspond to a position before a second reference point of the second transmit symbol and an end position of the second subset to correspond to a position after the second reference point of the second transmit symbol, and wherein the first reference point represents an end position of the transmit symbol, and the second reference point represents a position of a truncated cyclic prefix of the transmit symbol, the position of the truncated cyclic prefix being a start position of a transmit symbol component between the position of the truncated cyclic prefix and the end of the transmit symbol copied to a position before the transmit symbol; and performing phase adjustment on one or both of the first transmit symbol and the second transmit symbol, so that a symbol component whose end position is the first reference point in the first transmit symbol is the same as a symbol component whose end position is the second reference point in the second transmit symbol after the adjustment.

2. The method according to claim 1, wherein the performing phase adjustment on one or both of the first transmit symbol and the second transmit symbol comprises:

performing the phase adjustment on one or both of the first transmit symbol and the second transmit symbol based on one or more of:

an inverse fast Fourier transform (IFFT) size, a cyclic prefix length, a frequency resource position, a subcarrier center position, a subcarrier spacing, a sampling interval, a transmit symbol period, and a transmit symbol index.

3. The method according to claim 1, wherein the performing phase adjustment on one or both of the first transmit symbol and the second transmit symbol comprises:

performing the phase adjustment on one or both of the first transmit symbol and the second transmit symbol based on a phase difference between the first transmit symbol and the second transmit symbol.

4. The method according to claim 3, wherein the phase difference between the first transmit symbol and the second transmit symbol satisfies either:

$$e^{\left(j\frac{2\pi f_0 \Delta f T_{CP,l}}{N}\right)} \text{ or } e^{\left(j\frac{2\pi f_0 \Delta f N_{CP,l}}{N}\right)},$$

wherein $f_0$ represents the subcarrier center position, $\Delta f$ represents the subcarrier spacing, $T_{CP,l}$ represents duration of a cyclic prefix of an $l^{th}$ transmit symbol, $N_{cp,l}$ represents a quantity of sampling points of the cyclic prefix of the $l^{th}$ transmit symbol, l represents the transmit symbol index, j represents a complex-valued symbol, and N represents the IFFT size.

5. The method according to claim 1, wherein the performing phase adjustment on one or both of the first transmit symbol and the second transmit symbol comprises any one of:

dividing the first transmit symbol by a phase compensation factor;

multiplying the second transmit symbol by the phase compensation factor; and multiplying the first transmit symbol by a first phase factor, and multiplying the second transmit symbol by a second phase factor, wherein a difference between the first phase factor and the second phase factor is the phase compensation factor.

6. The method according to claim 1, wherein the first transmit symbol is a reference signal, and the second transmit symbol is a non-reference signal; or the first transmit symbol is a non-reference signal, and the second transmit symbol is a reference signal; or both the first transmit symbol and the second transmit symbol are discrete Fourier transform-spread-orthogonal frequency division multiplexing (DFT-s-OFDM) symbols.

7. A symbol processing method, comprising:

obtaining a plurality of complex-valued symbols;

grouping the plurality of complex-valued symbols into a plurality of sets, wherein the plurality of sets comprise a first set and a second set, the first set corresponds to a first transmit symbol, the second set corresponds to a second transmit symbol, the first transmit symbol and the second transmit symbol are continuous in time domain, the first transmit symbol is located before the second transmit symbol, and a complex-valued symbol in a first subset in the first set is the same as a complex-valued symbol in a second subset in the second set;

performing signal processing on the first set and the second set to generate the first transmit symbol and the second transmit symbol, wherein the signal processing comprises a cyclic shift or frequency domain weighting, and the signal processing causes a start position of the first subset to correspond to a position before a first reference point of the first transmit symbol and an end position of the first subset to correspond to a position after the first reference point of the first transmit symbol, wherein the start position of the first subset in the first set corresponds to a tail position of the first transmit symbol, and the end position of the first subset corresponds to a header position of the first transmit symbol, and further causes a start position of the second subset to correspond to a position before a second reference point of the second transmit symbol and an end position of the second subset to correspond to a position after the second reference point of the second transmit symbol, and wherein the first reference point represents an end position of the transmit symbol, and the second reference point represents a position of a truncated cyclic prefix of the transmit symbol, the position of the truncated cyclic prefix being a start position of a transmit symbol component between the position of the truncated cyclic prefix and the end of the transmit symbol copied to a position before the transmit symbol; and performing phase adjustment on one or both of the first transmit symbol and the second transmit symbol, so that a symbol component whose end position is the first reference point in the first transmit symbol is the same as a symbol component whose end position is the second reference point in the second transmit symbol after the adjustment.

8. The method according to claim 7, wherein the performing phase adjustment on one or both of the first transmit symbol and the second transmit symbol comprises:

performing the phase adjustment on one or both of the first transmit symbol and the second transmit symbol based on one or more of the following information:

an inverse fast Fourier transform (IFFT) size, a cyclic prefix length, a frequency resource position, a subcarrier center position, a subcarrier spacing, a sampling interval, a transmit symbol period, and a transmit symbol index.

9. The method according to claim 7, wherein the performing phase adjustment on one or both of the first transmit symbol and the second transmit symbol comprises:

performing the phase adjustment on one or both of the first transmit symbol and the second transmit symbol based on a phase difference between the first transmit symbol and the second transmit symbol.

10. The method according to claim 9, wherein the phase difference between the first transmit symbol and the second transmit symbol satisfies either of:

$$e^{\left(j\frac{2\pi f_0 \Delta f T_{CP,l}}{N}\right)} \text{ or } e^{\left(j\frac{2\pi f_0 \Delta f N_{CP,l}}{N}\right)},$$

wherein $f_0$ represents the subcarrier center position, $\Delta f$ represents the subcarrier spacing, $T_{CP,l}$ represents duration of a cyclic prefix of an $l^{th}$ transmit symbol, $N_{cp,l}$ represents a quantity of sampling points of the cyclic prefix of the $l^{th}$ transmit symbol, l represents the transmit symbol index, j represents a complex-valued symbol, and N represents the IFFT size.

11. The method according to claim 7, wherein the performing phase adjustment on one or both of the first transmit symbol and the second transmit symbol comprises any one of the following:

dividing the first transmit symbol by a phase compensation factor;

multiplying the second transmit symbol by the phase compensation factor; and multiplying the first transmit symbol by a first phase factor, and multiplying the second transmit symbol by a second phase factor, wherein a difference between the first phase factor and the second phase factor is the phase compensation factor.

12. The method according to claim 7, wherein both the first transmit symbol and the second transmit symbol are demodulation reference signals.

13. A symbol processing apparatus, comprising:

a processor, configured to obtain a plurality of complex-valued symbols;

group the plurality of complex-valued symbols into a plurality of sets, wherein each set corresponds to one transmit symbol, the plurality of sets comprise a first set corresponding to a first transmit symbol and a second set corresponding to a second transmit symbol, the first transmit symbol and the second transmit symbol are continuous in time domain, and the first transmit symbol is located before the second transmit symbol;

perform a copy operation on the first set and the second set, so that both the first set and the second set have a first complex-valued symbol, wherein a time domain index of a start position of a first subset formed by the first complex-valued symbol in the first set is the same as a time domain index of a start position of a second subset formed by the first complex-valued symbol in the second set;

perform signal processing on the first set and the second set after the copy operation, wherein the signal processing comprises a cyclic shift or frequency domain weighting, and the signal processing causes the start position of the first subset to correspond to a position before a first reference point of the first transmit symbol and an end position of the first subset to correspond to a position after the first reference point of the first transmit symbol, wherein the start position of the first subset in the first set corresponds to a tail position of the first transmit symbol, and the end position of the first subset corresponds to a header position of the first transmit symbol, and further causes the start position of the second subset to correspond to a position before a second reference point of the second transmit symbol and an end position of the second subset to correspond to a position after the second reference point of the second transmit symbol, and wherein the first reference point represents an end position of the transmit symbol, and the second reference point represents a position of a truncated cyclic prefix of the transmit symbol, the position of the truncated cyclic prefix being a start position of a transmit symbol component between the position of the truncated cyclic prefix and the end of the transmit symbol copied to a position before the transmit symbol;

generate the first transmit symbol and the second transmit symbol based on signals after the signal processing; and perform phase adjustment on one or both of the first transmit symbol and the second transmit symbol, so that a symbol component whose end position is the first reference point in the first transmit symbol is the same as a symbol component whose end position is the second reference point in the second transmit symbol after the adjustment.

14. The apparatus according to claim 13, wherein the processor is specifically configured to:

perform the phase adjustment on one or both of the first transmit symbol and the second transmit symbol based on one or more of the following information:

an inverse fast Fourier transform (IFFT) size, a cyclic prefix length, a frequency resource position, a subcarrier center position, a subcarrier spacing, a sampling interval, a transmit symbol period, and a transmit symbol index.

15. The apparatus according to claim 13, wherein the processor is specifically configured to:

perform the phase adjustment on one or both of the first transmit symbol and the second transmit symbol based on a phase difference between the first transmit symbol and the second transmit symbol.

16. The apparatus according to claim 15, wherein the phase difference between the first transmit symbol and the second transmit symbol satisfies either of:

$$e^{\left(j\frac{2\pi f_0 \Delta f T_{CP,l}}{N}\right)} \text{ or } e^{\left(j\frac{2\pi f_0 \Delta f N_{CP,l}}{N}\right)},$$

wherein $f_0$ represents the subcarrier center position, $\Delta f$ represents the subcarrier spacing, $T_{CP,l}$ represents duration of a cyclic prefix of an $l^{th}$ transmit symbol, $N_{cp,l}$ represents a quantity of sampling points of the cyclic prefix of the $l^{th}$ transmit symbol, l represents the transmit symbol index, j represents a complex-valued symbol, and N represents the IFFT size.

17. The apparatus according to claim 13, wherein the processor is specifically configured to:

divide the first transmit symbol by a phase compensation factor; or multiply the second transmit symbol by the phase compensation factor; or multiply the first transmit symbol by a first phase factor, and multiply the second transmit symbol by a second phase factor, wherein a difference between the first phase factor and the second phase factor is the phase compensation factor.

18. The apparatus according to claim 13, wherein the first transmit symbol is a reference signal, and the second transmit symbol is a non-reference signal; or the first transmit symbol is a non-reference signal, and the second transmit symbol is a reference signal; or both the first transmit symbol and the second transmit symbol are discrete Fourier transform-spread-orthogonal frequency division multiplexing (DFT-s-OFDM) symbols.

* * * * *